United States Patent
Koh et al.

(10) Patent No.: US 9,442,696 B1
(45) Date of Patent: Sep. 13, 2016

(54) INTERACTIVE PARTITIONING AND MAPPING OF AN APPLICATION ACROSS MULTIPLE HETEROGENEOUS COMPUTATIONAL DEVICES FROM A CO-SIMULATION DESIGN ENVIRONMENT

(71) Applicant: The MathWorks, Inc., Natick, MA (US)

(72) Inventors: David Koh, Boston, MA (US); Murat Belge, Westford, MA (US)

(73) Assignee: The Math Works, Inc., Natick, MA (US)

( * ) Notice: Subject to any disclaimer, the term of this patent is extended or adjusted under 35 U.S.C. 154(b) by 76 days.

(21) Appl. No.: 14/157,239

(22) Filed: Jan. 16, 2014

(51) Int. Cl.
*G06F 9/44* (2006.01)
*G06F 9/45* (2006.01)
*G06F 17/50* (2006.01)
*G06F 9/50* (2006.01)

(52) U.S. Cl.
CPC . *G06F 8/00* (2013.01); *G06F 8/34* (2013.01); *G06F 9/5066* (2013.01); *G06F 17/5009* (2013.01); *G06F 8/447* (2013.01); *G06F 9/5044* (2013.01); *G06F 17/5027* (2013.01)

(58) Field of Classification Search
CPC .... G06F 9/4436; G06F 9/485; G06F 9/5016; G06F 9/5022; G06F 9/465; G06F 8/34; G06F 8/20; G06F 17/30294; G06F 17/30572; G06F 17/5045; G06F 17/5009; G06F 17/5022; G06F 17/5027; G06F 8/447; G06F 8/44; G06F 8/423; G06F 9/5066; G06F 9/4411; G06F 9/5027; G06F 9/5044; G06F 9/5094; G06F 9/44; G06F 9/45558; H03M 13/036; H03M 13/1165
See application file for complete search history.

(56) References Cited

U.S. PATENT DOCUMENTS

| | | | | |
|---|---|---|---|---|
| 5,870,588 A * | 2/1999 | Rompaey | ............ | G06F 17/5045 703/13 |
| 6,751,583 B1 * | 6/2004 | Clarke | ................ | G06F 17/5022 703/17 |
| 6,766,284 B2 * | 7/2004 | Finch | ...................... | G06F 8/447 703/13 |

(Continued)

OTHER PUBLICATIONS

J.M. Dominguez et al., New multi-GPU implementation for smoothed particle hydrodynamics on heterogeneous cluster, 2013, [Retrieved on Apr. 14, 2016]. Retrieved from the internet: <URL: http://ac.els-cdn.com/S0010465513001057/1-s2.0-S0010465513001057-main.pdf?> 13 Pages (1848-1860).*

(Continued)

*Primary Examiner* — Thuy Dao
*Assistant Examiner* — Anibal Rivera
(74) *Attorney, Agent, or Firm* — Nelson Mullins Riley & Scarborough LLP

(57) ABSTRACT

In an embodiment, a method for interactively changing allocation of an application including multiple algorithm components executing on a heterogeneous target environment (HTE) provides a user interface in a co-simulation design environment. The user interface is associated with the application having multiple algorithm components executing on the HTE that includes multiple computing devices with different processing capabilities. The method also sets attributes of the allocation scheme of the application using the user interface. The setting occurs when the application is executing. The method further receives data associated with the executing of the application in the co-simulation design environment when the application is executing subsequent to the setting of the attributes of the allocation scheme.

31 Claims, 23 Drawing Sheets

(56) References Cited

U.S. PATENT DOCUMENTS

| | | | | |
|---|---|---|---|---|
| 7,072,820 | B1* | 7/2006 | Bailey | G06F 17/5022 703/13 |
| 7,085,670 | B2* | 8/2006 | Odom | G06F 9/4411 702/127 |
| 7,275,026 | B2* | 9/2007 | Mani | G06F 17/5009 345/621 |
| 7,302,670 | B2* | 11/2007 | Bowyer | G06F 17/5045 716/102 |
| 7,366,651 | B1* | 4/2008 | Milne | G06F 17/5022 703/14 |
| 7,478,031 | B2* | 1/2009 | Master | G06F 17/5022 703/14 |
| 7,530,052 | B2* | 5/2009 | Morrow | G06F 8/34 715/763 |
| 7,694,249 | B2* | 4/2010 | Hamilton | G06F 17/5045 716/108 |
| 7,970,596 | B2* | 6/2011 | Bade | G06F 17/5022 703/13 |
| 8,041,553 | B1* | 10/2011 | Hernandez | G01R 31/318357 703/14 |
| 8,209,158 | B1* | 6/2012 | Fielder | G06F 17/5009 703/13 |
| 8,244,512 | B1* | 8/2012 | Tseng | G06F 17/5022 703/13 |
| 8,250,339 | B2* | 8/2012 | Master | G06F 7/57 715/15 |
| 8,276,135 | B2* | 9/2012 | Master | G06F 17/5022 717/161 |
| 8,370,233 | B2* | 2/2013 | Kaisermayr | G06Q 30/0283 370/389 |
| 2002/0083420 | A1* | 6/2002 | Zammit | G06F 17/5022 717/135 |
| 2002/0129181 | A1* | 9/2002 | Lahiri | G06F 13/362 710/113 |
| 2005/0066305 | A1* | 3/2005 | Lisanke | G06F 17/5022 717/104 |
| 2006/0015313 | A1* | 1/2006 | Wang | G06F 17/5027 703/14 |
| 2006/0277305 | A1* | 12/2006 | Bernardin | G06Q 10/06 709/226 |
| 2008/0141227 | A1* | 6/2008 | Waters | G06F 8/44 717/140 |
| 2010/0275101 | A1* | 10/2010 | Yokokawa | H03M 13/1165 714/763 |
| 2011/0066828 | A1* | 3/2011 | Wolfe | G06F 9/5044 712/220 |
| 2011/0307233 | A1* | 12/2011 | Tseng | G06F 17/5022 703/14 |
| 2012/0278811 | A1* | 11/2012 | Baynast | G06F 9/5027 718/104 |
| 2013/0166992 | A1* | 6/2013 | Shinohara | H03M 13/036 714/766 |
| 2013/0304450 | A1* | 11/2013 | Tsai | G06F 17/5022 703/14 |
| 2014/0040707 | A1* | 2/2014 | Shinohara | H04L 1/0047 714/776 |
| 2014/0068560 | A1* | 3/2014 | Eksten | G06F 9/5066 717/120 |
| 2014/0082452 | A1* | 3/2014 | Shinohara | H03M 13/036 714/758 |
| 2014/0101309 | A1* | 4/2014 | Guminy | H04L 43/0817 709/224 |
| 2014/0149969 | A1* | 5/2014 | Brower | G06F 8/423 717/140 |
| 2014/0189297 | A1* | 7/2014 | Narvaez | G06F 9/45558 712/29 |
| 2014/0189299 | A1* | 7/2014 | Narvaez | G06F 9/44 712/30 |
| 2014/0189704 | A1* | 7/2014 | Narvaez | G06F 9/5094 718/104 |
| 2014/0359590 | A1* | 12/2014 | Kodosky | G06F 8/451 717/149 |

OTHER PUBLICATIONS

Shivani Raghav et al., Full System Simulation of Many-Core Heterogeneous SoCs using GPU and QEMU Semihosting, ACM 2012, [Retrieved on Apr. 14, 2016]. Retrieved from the internet: <URL: http://delivery.acm.org/10.1145/2160000/2159442/p101-raghav.pdf?> 9 Pages (101-109).*

* cited by examiner

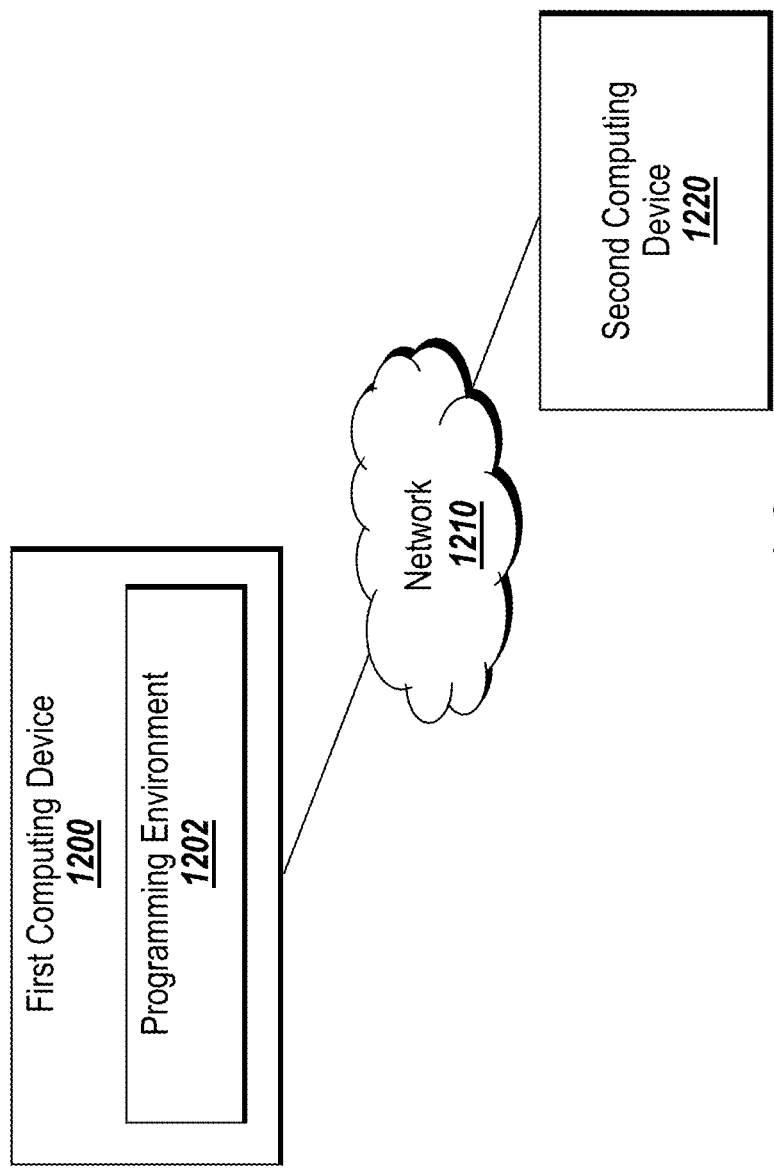

INTERACTIVE PARTITIONING AND MAPPING OF AN APPLICATION ACROSS MULTIPLE HETEROGENEOUS COMPUTATIONAL DEVICES FROM A CO-SIMULATION DESIGN ENVIRONMENT

BACKGROUND INFORMATION

Co-simulation is a technique used by developers to design, test, and optimize an application that is to be implemented on particular target hardware. With co-simulation, one or more components of an application in development execute on the target hardware. The target hardware may be a heterogeneous target environment (HTE) with computational devices having different processing capabilities. An HTE may include computational devices having different execution characteristics. For example, a first computational device may have first execution characteristics and a second computational device may have second execution characteristics, where the first and second execution characteristics differ from each other.

During co-simulation, execution of the application under development may include one or more application components that are simulated in the host simulation environment and one or more application components that are executed on the heterogeneous target environment.

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIG. 12 depicts an exemplary distributed system suitable for practicing an exemplary embodiment.

DETAILED DESCRIPTION

Figures 1A, 1B:
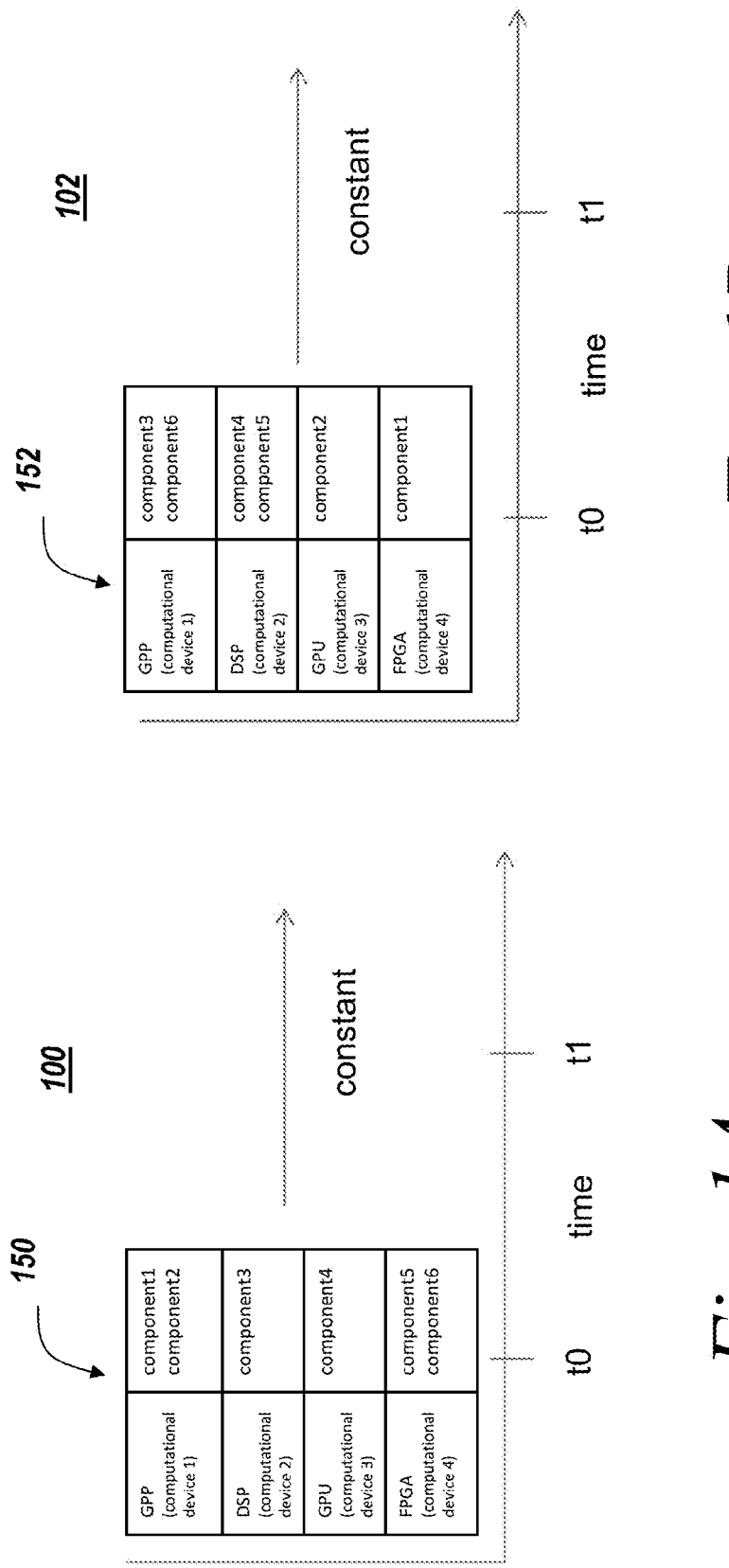
FIGS. 1A-1C depict exemplary conventional static allocators.

According to various embodiments, an application is designed in a co-simulation design environment. The application may be designed by a user. A user may be a person, an algorithm, a program that is part of an application running in simulation, or any combination thereof. The user may interact with a co-simulation design environment discussed below. Accordingly, interaction may refer to an interaction with a person, a program or any combination thereof.

Exemplary co-simulation design environments may include graphical programming environments, e.g., block diagram environments (BDEs), and/or textual programming environments (TPEs). An application designed in a BDE may be a BDE model and an application designed in a TPE may be a TPE model. According to various embodiments, a TPE model may include, but is not limited to, one or more of a textual program, a script, a function, another TPE model, etc. A BDE model may include, but is not limited to, one or more of a block, a subsystem, another BDE model, etc.

An application designed in the co-simulation design environment may include one or more elements. An element of the application may refer to any constituents of the application. For example, for a BDE model, an element may include a line representing a signal or a block representing an operation to be performed on the signal. An application component may be formed by grouping together one or more elements of the application. An application component may be a subset of the application that is able to run independently from the rest of the application and that has defined boundaries along with a defined input and output.

In a TPE, the application components may be formed by grouping elements of the application by function, object, method, model, textual program, other demarcated boundary (e.g., a conditional statement), etc.

In a BDE, the application components may be formed by grouping elements of the application by block, subsystem, rate, sub-model (e.g., Referenced Model), other demarcated boundary, etc. An application component may be composed of one or more executions of an algorithm that may be mapped to computation devices of a heterogeneous target environment (HTE).

An application component may be designated to execute on the HTE. The HTE may include one or more computational devices. For example, heterogeneous computational devices may include a general-purpose preprocessor (GPP), a graphics processing unit (GPU), a digital signal processor (DSP), a programmable logic controller (PLC), a field-programmable gate array (FPGA), an application-specific integrated circuit (ASIC), or simulators of computational devices, including a hardware description language (HDL)

simulator, SystemC simulator, transaction-level model (TLM) based virtual platform, etc.

Two or more of the computational devices in the HTE may be connected by an input/output (I/O) interface that allows for the transfer of data between the connected devices. The I/O interface may include a physical connection, such as an Ethernet connection or a serial interface connection, and/or an associated protocol for transmitting and receiving data, such as a Transmission Control Protocol/Internet Protocol (TCP/IP), a Serial Peripheral Interface (SPI), etc. Each of the I/O interfaces may have specific characteristics that makes the I/O interface suitable for certain tasks. For example, a serial RapidIO (SRIO) interface is a serialized high-bandwidth communication interface that may be used to exchange large amounts of data, such as video data.

An allocator may allocate, or map, one or more application components to computational devices of the HTE when the application is compiled (i.e., at compile-time or synthesis time) or when the application is executing (i.e., at run-time or at execution time). Conventionally, the allocator may be implemented in a target processing device, such as found in the HTE. A conventional allocator may include a conventional static allocator (CSA) (i.e., where the allocation occurs at compile-time or synthesis time) or a conventional dynamic allocator (CDA) (i.e., where the allocation occurs at run-time or at execution-time). According to various embodiments, an allocator may implement one or more allocation schemes.

Conventional Allocators

Figure 1C:
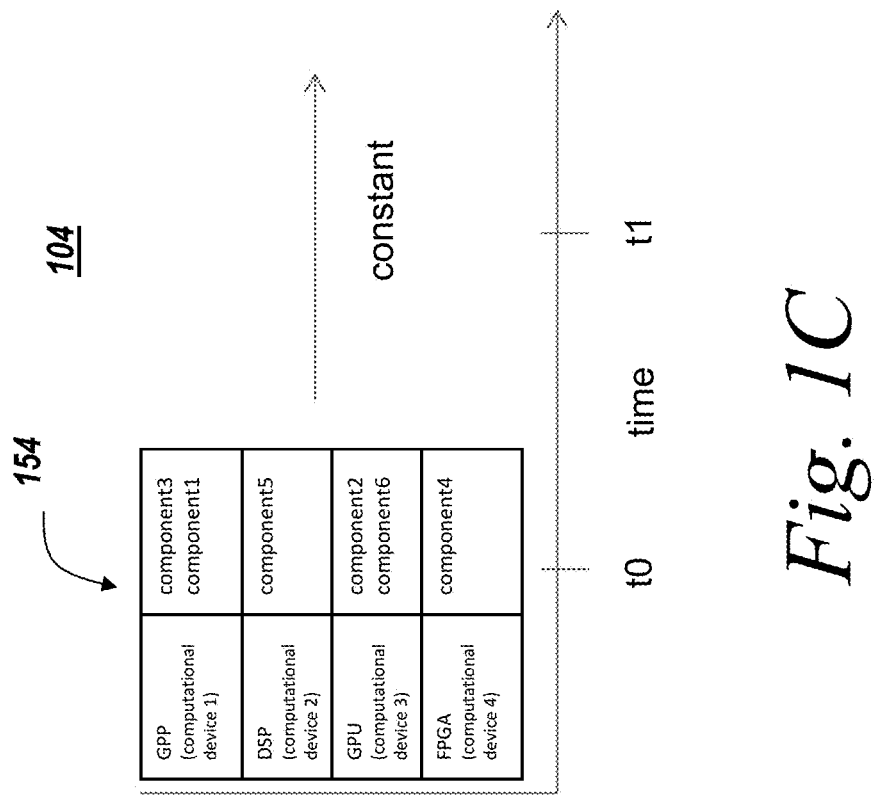

FIGS. 1A-1C illustrate conventional static allocators 100, 102, 104. A CSA is an allocator, implemented on a HTE, that implements a fixed mapping between execution of an algorithm and available computational devices of the HTE. For example, a CSA may map execution of an algorithm among one or more application components executing on an THE. The mapping, i.e. allocation scheme, created by CSA 100, 102, 104 does not change during execution (i.e., during run-time) of the application on the HTE.

According to some embodiments, the computational devices of the HTE illustrated in FIG. 1A may include, for example, GPP as computational device 1, DSP as computational device 2, GPU as computational device 3 and FPGA as computational device 4.

For example, the allocation scheme implemented by CSA 100 illustrated in FIG. 1A has the following fixed mapping 150: execution of application components 1 and 2 is allocated to computational device 1, execution of application component 3 is allocated to computational device 2, execution of application component 4 is allocated to computational device 3, and execution of application components 5 and 6 is allocated to computational device 4. The mapping 150 between the execution of application components 1-6 and computational devices 1-4 implemented by CSA 100 remains unchanged during the execution of the application components 1-6 on the HTE with computational devices 1-4.

The allocation scheme implemented by CSA 102 illustrated in FIG. 1B has a different fixed mapping 152. As shown in FIG. 1B, CSA 102 allocates execution of application components 3 and 6 to computational device 1, execution of application components 4 and 5 to computational device 2, execution of application component 2 to computational device 3, and execution of application component 1 to computational device 4. The mapping 152 between the execution of application components 1-6 and computational devices 1-4 102 remains unchanged during the execution of the application components 1-6 on the HTE that includes computational devices 1-4.

The allocation scheme implemented by CSA 104 illustrated in FIG. 1C has a different fixed mapping 154. As shown in FIG. 1C, CSA 104 allocates execution of application components 3 and 1 to computational device 1, execution of application component 5 to computational device 2, execution of application components 2 and 6 to computational device 3, and execution of application component 4 to computational device 4. The mapping 154 between the execution of application components 1-6 and computational devices 1-4 remains unchanged during the execution of the application components 1-6 on the HTE that includes computational devices 1-4.

Figure 2A:
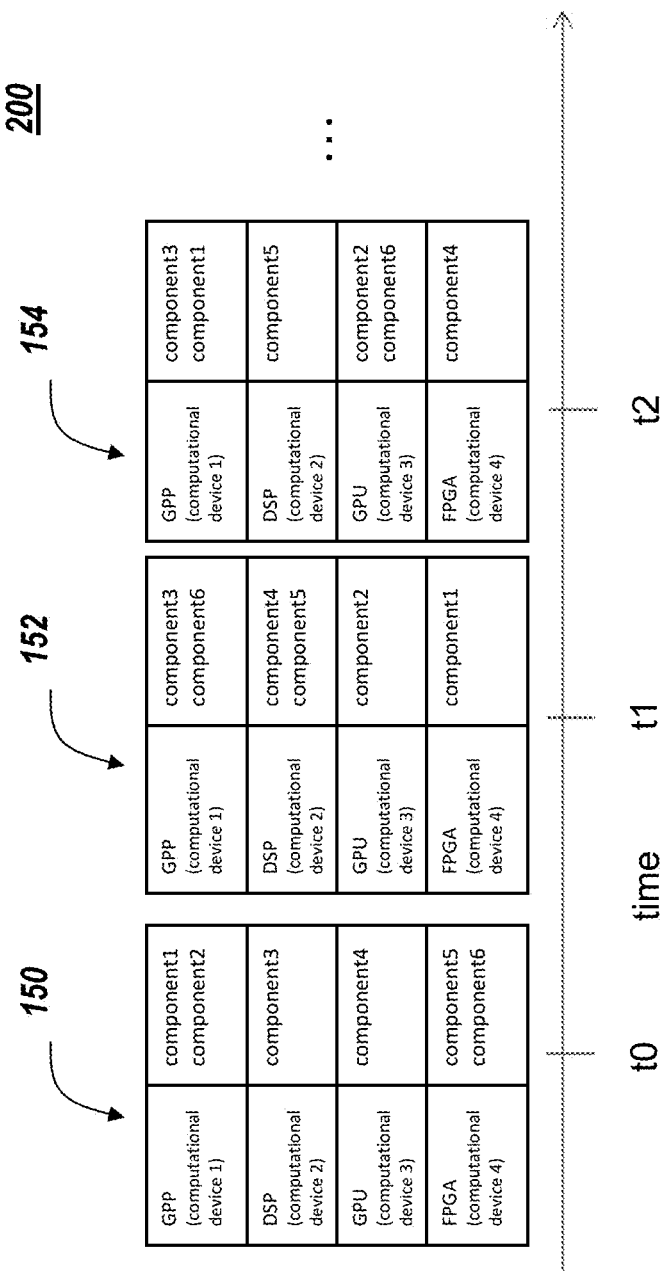
FIGS. 2A-2B depict exemplary conventional dynamic allocators.
Figure 2B:
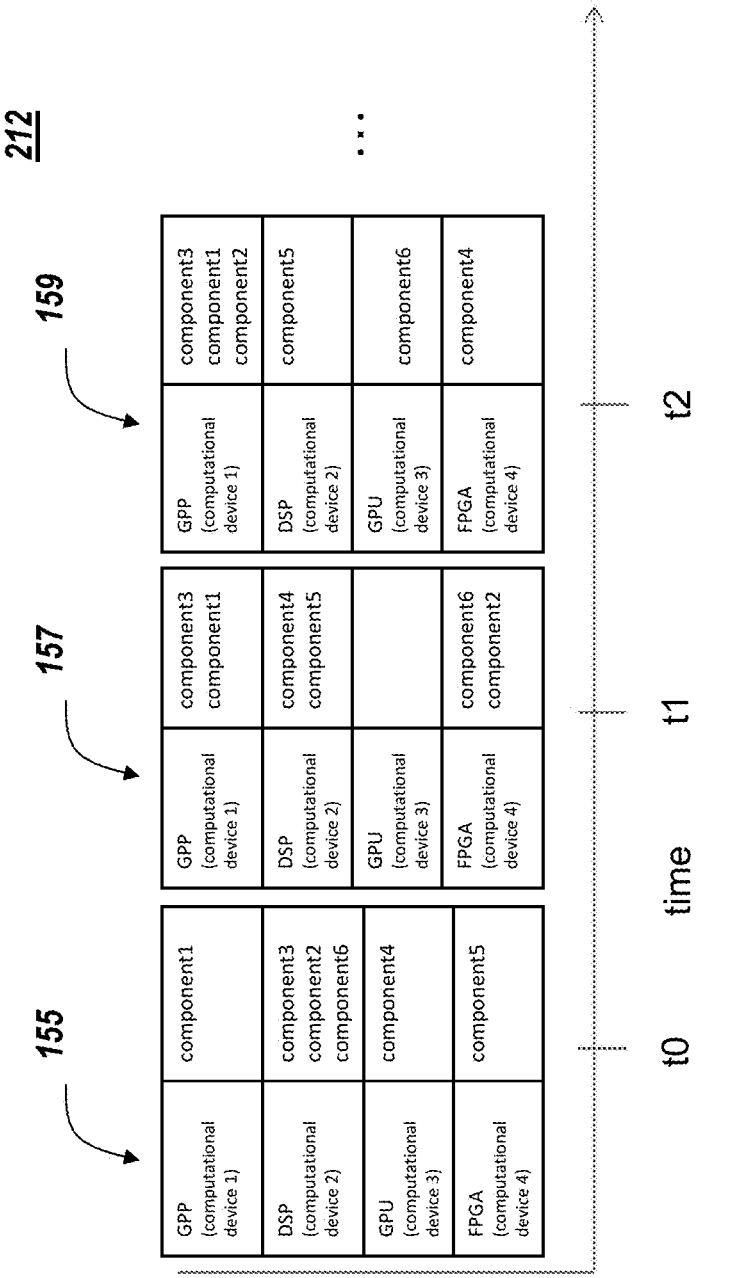

FIG. 2A-2B illustrate conventional dynamic allocators 200, 212. A conventional dynamic allocator (CDA) is an allocator, implemented on a HTE, that implements dynamic mapping between execution of algorithms of one or more application components and available computational devices of the HTE at run-time or at execution-time based on an allocation policy. The allocation policy may be based on a rule set associated with the dynamic state of the HTE during run-time or execution-time and optionally, the attributes of the execution of the algorithm to be processed. The CDA is typically implemented as an algorithm that dynamically allocates execution of application components to computational devices of an HTE based on instantaneous conditions of a run-time or execution-time environment. One type of dynamic allocator is a load-balancing dynamic allocator. In a load-balancing dynamic allocator, an application component to be executed may be allocated to a least busy computational device among those available in the HTE at that instance of time. The allocation of a component to a specific computational device may be changed multiple times while the application executes (i.e., the allocation may change over time).

Other rule sets for exemplary conventional dynamic allocation scheme may implement, for example, a shortest execution time dynamic allocator. A shortest execution time dynamic allocator allocates an application component having a shortest predicted execution to a computational device that is the least busy. An application component having the second shortest execution time is allocated to a computation device that is the second least busy. One of ordinary skill in the art will appreciate that load-balancing and shortest execution time allocation execution rules and/or rule sets are used for illustrative purposes only and that the execution criteria may employ other execution techniques, such as rules and/or rule sets without departing from the spirit of the invention.

For example, CDA 200 illustrated in FIG. 2A may change the mapping between execution of application components 1-6 and computational devices 1-4 when application components are executing on the HTE. In an embodiment, CDA 200 may implement allocation schemes 150, 152 and 154 used by a CSA (as illustrated in FIGS. 1A-1C). At time t=0, CDA 200 may implement first mapping 150. At time t=1, CDA 200 may change the mapping and implement second mapping 152. While the execution of algorithms of the application components continues on the computational devices of the HTE, CDA 200 implements third mapping 154 at time t=3.

As shown in FIG. 2A, CDA 200 may change the mapping of an execution algorithm of an application component to a specific computational device multiple times during the execution of the application. One of ordinary skill in the art will appreciate that CDA 200 does not have to allocate execution algorithm of the application components to each computational device of the HTE. According to various embodiments, CDA 200 may choose to allocate execution of no application component or all application components to a given computational device of the HTE.

FIG. 2B illustrates a different exemplary dynamic allocator implemented by CDA 212. CDA 212 illustrated in FIG. 2B may change the mapping of execution of the application components 1-6 to computational devices 1-4 (discussed in connection with FIGS. 1A-C and 2A) during the execution of the application components on the HTE. In an embodiment, CDA 212 may implement allocation schemes 155, 157 and 159. At time t=0, CDA 212 may implement first mapping 155. At time t=1, CDA 212 may change the mapping and implement second mapping 157. While the execution of algorithms of the application components continues on the computational devices of the HTE, CDA 212 implements third mapping 159 at time t=3. According to various embodiments, conventional allocators may be implemented in the co-simulation design environment. Such allocators are referred to as co-simulation allocators. For example, if a CSA is implemented in the co-simulation design environment, such allocator is referred as a co-simulation static allocator. Accordingly, the co-simulation static allocator is an allocator implemented in the co-simulation environment with a fixed mapping between execution of algorithm and computational devices. The mapping implemented by a co-simulation static allocator is similar to the mapping illustrated in FIGS. 1A-1C. However, contrary to a CSA, which is implemented on the target environment, the co-simulation static allocator is implemented in the co-simulation design environment.

If a CDA is implemented in the co-simulation design environment, such allocator is referred as a co-simulation dynamic allocator. Accordingly, the co-simulation dynamic allocator is an allocator implemented in the co-simulation environment with a dynamic mapping between execution of algorithm and computational devices. The mapping implemented by a co-simulation dynamic allocator is similar to the mapping illustrated in FIG. 2. However, contrary to a CDA which is implemented on the target environment the co-simulation dynamic allocator is implemented in the co-simulation design environment.

Interactive Allocators

According to various embodiments, interactive allocators may be constructed from the co-simulation allocators. For example, an interactive static allocator may be constructed from a co-simulation static allocator. The interactive static allocator is an allocator implemented in the co-simulation environment that may interactively change from one co-simulation static allocator to another co-simulation static allocator during co-simulation, without re-generating, re-compiling or re-running code for application components executing in the co-simulation environment.

The interactive static allocator may re-allocate execution of application components to computational devices operating on HTE during co-simulation, i.e. at run-time or execution-time, from the co-simulation environment. This form of operation by an interactive static allocator may be referred to as changing of co-simulation static allocators. The changing of one co-simulation static allocator to another co-simulation static allocator may be prompted by the user. Changing one co-simulation static allocator to another co-simulation static allocator has the effect of changing the mapping of application components to computational devices without re-generating, re-compiling or re-running code for the one or more application components.

Figure 3:
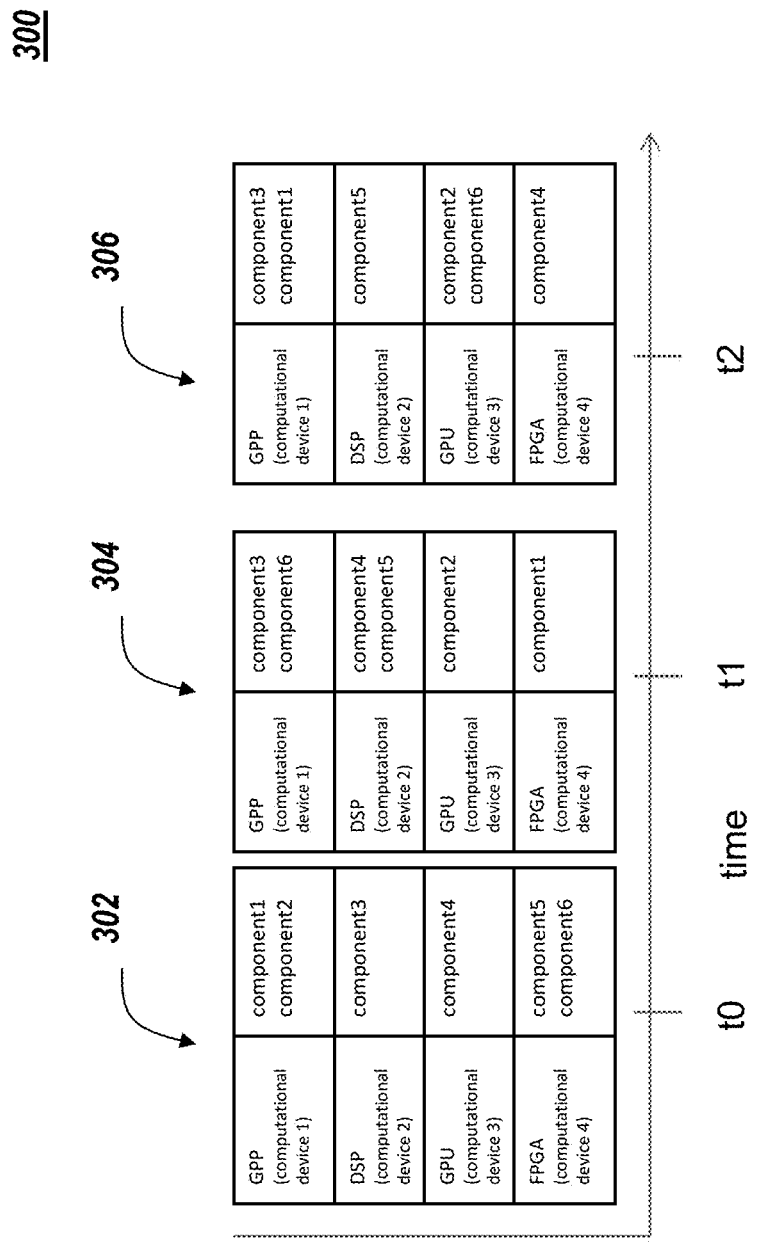
FIG. 3 depicts an exemplary interactive static allocator.

FIG. 3 illustrates an exemplary interactive static allocator (ISA) 300. As illustrated in FIG. 3, ISA 300 may be implemented in the co-simulation environment and may interactively change from one co-simulation static allocator 302 at time t=0 to another co-simulation static allocator 304 at time t=1 and then to another co-simulation static allocator 306 at time t=2 during co-simulation, without re-generating, re-compiling or re-running code for the one or more application components.

At time t=0, ISA 300 implements a first co-simulation static allocator 302 where execution of the application components 1 and 2 is allocated to computational device 1, execution of the application component 3 is allocated to computational device 2, execution of the application component 4 is allocated to computational device 3, and execution of the application components 5 and 6 is allocated to computational device 4.

At time t=1, ISA 300 may change to co-simulation static allocator 304 without re-generating, re-compiling or re-running code for the one or more application components. As illustrated in FIG. 3, at time t=1, execution of the application components 3 and 6 is allocated to computational device 1, execution of the application components 4 and 5 is allocated to computational device 2, execution of the application component 2 is allocated to computational device 3, and execution of the application component 1 is allocated to computational device 4.

At time t=2, ISA 300 may change to co-simulation static allocator 306 without re-generating, re-compiling or re-running code for the one or more application components. As illustrated in FIG. 3, at time t=2, execution of the application components 3 and 1 is allocated to computational device 1, execution of the application component 5 is allocated to computational device 2, execution of the application components 2 and 6 is allocated to computational device 3, and execution of the application component 4 is allocated to computational device 4.

The technique of changing the mapping between execution of algorithm and computational devices at run-time or at execution-time, such as changing from co-simulation static allocator 302 to co-simulation static allocator 304, may be thought of as changing of co-simulation static allocators during co-simulation (i.e., run-time or execution-time), without re-generating, re-compiling or re-running code for the one or more application components. In certain embodiments, a desired co-simulation static allocator may be chosen during co-simulation. Based on the selected co-simulation static allocator, a desired co-simulation static allocator that will implement a static mapping of components to computational devices at compile time of the application may be automatically generated. This generated co-simulation static allocator may be reused for subsequent executions of the application on HTE.

According to various embodiments, interactive dynamic allocators may be constructed from co-simulation allocators. For example, an interactive dynamic allocator may be constructed from a co-simulation dynamic allocator. The interactive dynamic allocator is an allocator implemented in the co-simulation environment that may interactively change from one co-simulation dynamic allocator to another co-simulation dynamic allocator during co-simulation, without re-generating, re-compiling or re-running code for the one or more application components.

The interactive dynamic allocator re-allocates execution of application components to computational devices during co-simulation, i.e. at run-time or at execution-time, from the co-simulation environment. Accordingly, the interactive dynamic allocator is an allocator implemented in the co-simulation environment that may vary from one co-simulation dynamic allocator to another co-simulation dynamic allocator at run-time or at execution-time during co-simulation, without re-generating, re-compiling or re-running code for the one or more application components. This form of operation by an interactive dynamic allocator can be referred to as changing of co-simulation dynamic allocators. The changing of one co-simulation dynamic allocator to another co-simulation dynamic allocator may be prompted by the user. As provided above, the user may be a person, an algorithm, a program that is part of an application running in simulation, or any combination thereof.

A co-simulation dynamic allocator re-allocates execution of application components to computational devices based on, for example, conditions and/or rule sets of the run-time or execution-time environment during co-simulation without re-generating, re-compiling or re-running code for the one or more application components. For example, an interactive dynamic allocator may change a first co-simulation dynamic allocator to a second co-simulation dynamic allocator. The first co-simulation dynamic allocator may be based on load-balancing, where the execution algorithm of an application component is allocated to a least busy computational device at that instance of time. The second co-simulation dynamic allocator may allocate the execution of the application component to the computational device that has been running the longest. Other conditions and/or rule sets, such as dependency among algorithms (e.g., requiring two or more application components to run on the same computational device, etc.), can be used to determine how co-simulation dynamic allocators may allocate execution of application components to computational devices. In some embodiments, a desired co-simulation dynamic allocator may be selected during co-simulation. Based on the selected co-simulation dynamic allocator, a desired co-simulation dynamic allocator may be automatically generated using an embodiment of the invention. The generated co-simulation dynamic allocator may be reused for subsequent executions of the application on the HTE.

Figure 4:
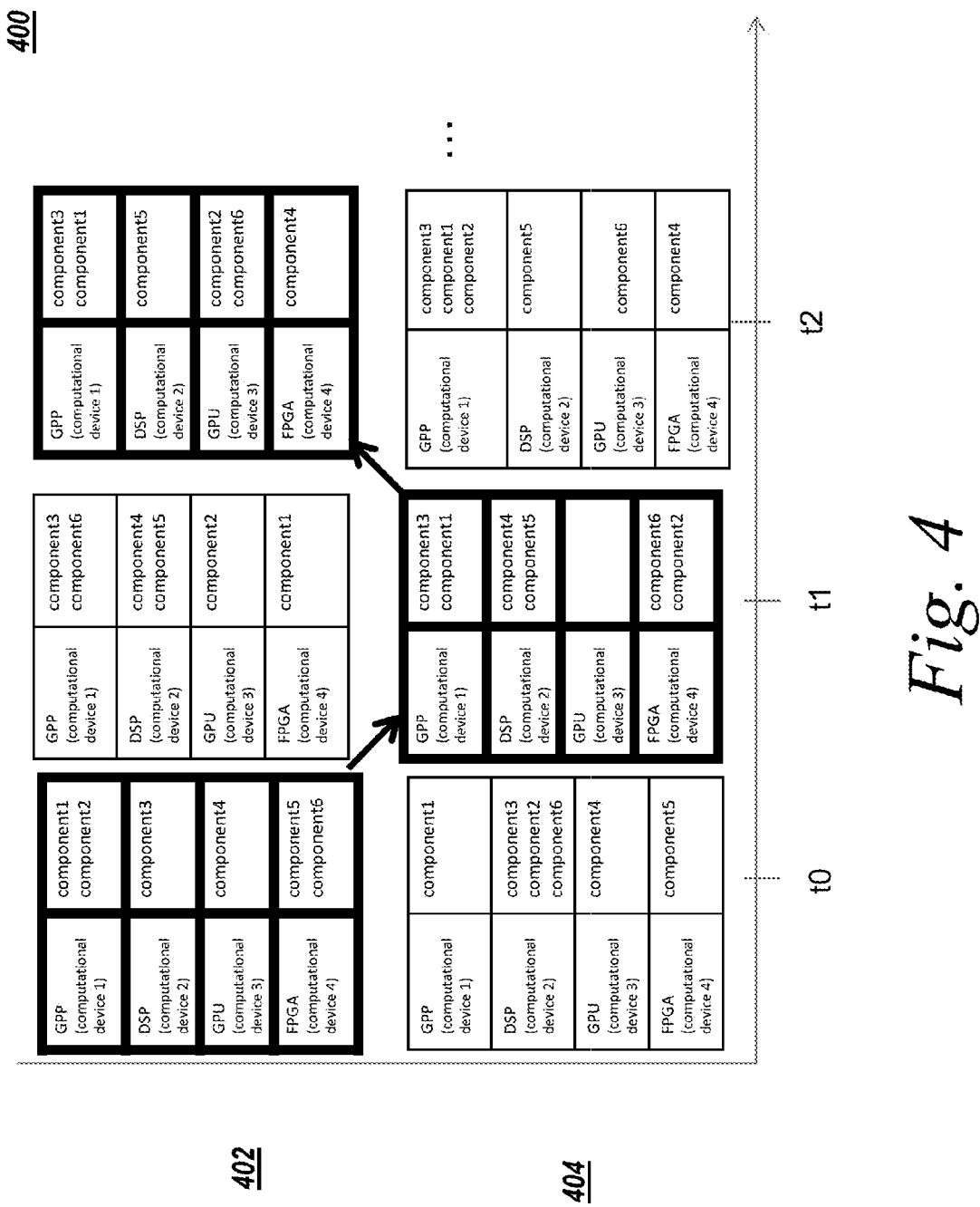
FIG. 4 depicts an exemplary interactive dynamic allocator.

FIG. 4 illustrates an exemplary interactive dynamic allocator (IDA) 400. IDA 400 may be implemented in the co-simulation environment. may interactively change from one co-simulation dynamic allocator 402 to another co-simulation dynamic allocator 404 during co-simulation, without re-generating, re-compiling or re-running code for the one or more application components. Changing from one co-simulation dynamic allocator to another co-simulation dynamic allocator has the effect of changing the mapping between execution of application components and computational devices without re-generating, re-compiling or re-running code for the one or more application components.

At time t=0, IDA 400 implements the first mapping of co-simulation dynamic allocator 402 where execution of the application components 1 and 2 is allocated to computational device 1, execution of the application component 3 is allocated to computational device 2, execution of the application component 4 is allocated to computational device 3, and execution of the application components 5 and 6 is allocated to computational device 4.

At time t=1, IDA 400 may change to co-simulation dynamic allocator 404 without re-generating, re-compiling or re-running code for the one or more application components. IDA 400 may implement a second mapping of co-simulation dynamic allocator 404 where: execution of the application components 3 and 1 is allocated to computational device 1, execution of the application components 4 and 5 is allocated to computational device 2, execution of the application components 6 and 2 is allocated to computational device 4.

At time t=2, IDA 400 may change back to co-simulation dynamic allocator 402 without re-generating, re-compiling or re-running code for the one or more application components. IDA 400 may implement a third mapping of co-simulation dynamic allocator 402 where: execution of the application components 3 and 1 is allocated to computational device 1, execution of the application component 5 is allocated to computational device 2, execution of the application components 2 and 6 is allocated to computational device 3 and execution of the application component 4 is allocated to computational device 4.

Changes to an execution mapping of application components to computational devices at run-time or execution-time, such as changing from co-simulation dynamic allocator 402 to co-simulation dynamic allocator 404, is a technique that can be referred to as changing co-simulation dynamic allocators during co-simulation (i.e., run-time or execution-time) without re-generating, re-compiling or re-running code for the one or more application components. In certain embodiments, a desired co-simulation dynamic allocator may be chosen during co-simulation. Based on the selected co-simulation dynamic allocator, a desired co-simulation dynamic allocator that will implement a dynamic mapping of application components to computational devices at compile time of the application may be automatically generated. This generated co-simulation dynamic allocator may be reused for subsequent executions of the application on the HTE.

A co-simulation dynamic allocator can re-allocate execution of application components to computational devices during co-simulation, i.e. at run-time or at execution-time, from the co-simulation environment. The changing of one execution mapping of application components to another execution mapping of application components is performed by the co-simulation dynamic allocator. A co-simulation dynamic allocator can change the execution mappings of application components to computational devices without re-generating, re-compiling or re-running code for the one or more application components.

A co-simulation dynamic allocator may operate in a manner similar to that of an ISA. By way of example, the co-simulation dynamic allocator 402 of FIG. 4 may operate in a manner similar to that of ISA 300 of FIG. 3. According to various embodiments, an interactive static allocator may help to generate an optimal CSA. For example, interactive static allocator 300 of FIG. 3 may be used to generate an optimal CSA, such as the CSA 100, 102 or 104.

In some embodiments, a co-simulation dynamic allocator may help to generate a CDA. For example, the co-simulation dynamic allocator 402 or 404 of FIG. 4 may be used to generate a CDA, such as the CDA 200 or 212. In some embodiments, a co-simulation dynamic allocator may be used to construct an IDA, which may be used to generate an optimal CDA. For example, the co-simulation dynamic allocator 400 and/or 402 of FIG. 4 may be used to construct an IDA, such as the IDA 400 illustrated in FIG. 4. IDA 400 may be used to generate an optimal CDA, such as the CDA 200 or 212.

The interactive static and dynamic allocators discussed above may allow a user to interactively reallocate execution of application components to different computational devices of the HTE the one or more application components are executing, (i.e., without stopping execution of the one or more application components). The re-allocation may not alter the design of the one or more application components and may not involve re-generating, re-compiling or re-running code for the one or more application components. Accordingly, re-allocation may provide improved efficiency and/or time savings as compared to conventional approaches that require re-generating, re-compiling, and re-running of code for the components when determining a suitable conventional static and/or dynamic allocator. For example, conventional allocation schemes assess a single candidate conventional allocator. If a different allocation scheme is desired, conventional schemes require stopping an HTE, re-generating, re-compiling, and re-running code for the application using the different allocation scheme.

According to various embodiments, a desired co-simulation static or dynamic allocator may be identified during co-simulation using interactive allocation. The desired conventional static or dynamic allocator (that corresponds to the identified co-simulation static or dynamic allocator) may then be generated for standalone deployment of the application on the HTE. Contrary to conventional allocation schemes, embodiments allow for interactively altering co-simulation static or dynamic allocators to generate the desired conventional static or dynamic allocator without re-generating, re-compiling or re-running code for the application.

Embodiments allow profiling results, i.e. run-time statistics or execution-time statistics of various static and dynamic allocation schemes to be considered and used. For example, relevant run-time or execution-time statistics, such as computational load, observed latency, memory usage, power consumption, etc., may be streamed back to the co-simulation design environment from an HTE in real time, (i.e. while the code for the application components is executing on the HTE).

A portion of the run-time or execution-time statistics may be provided to a user in various graphical and/or textual formats, if desired. Based on the profiling results, the user may change the co-simulation static or dynamic allocation scheme to improve execution efficiency of the code. For example, improved execution speed may include, but is not limited to, increasing execution speed, minimizing memory usage, minimizing power consumption, improving load distribution across computational devices, minimizing power consumption, minimizing communication among the computational devices, minimizing latency at various computing devices, etc. For example, a user may change an allocation scheme to achieve faster execution speeds for an application and/or to better meet application design constraints.

Exemplary embodiments may allow for run-time or execution-time allocation experiments to be conducted in the co-simulation design environment. Experiments may be used to determine and subsequently generate allocators that satisfy a design requirement for an application. A generated allocator may identify an allocation scheme for executing the application being designed in the co-simulation design environment on the HTE. The generated allocator may be reused in subsequent executions of the application on the HTE.

Figure 5:
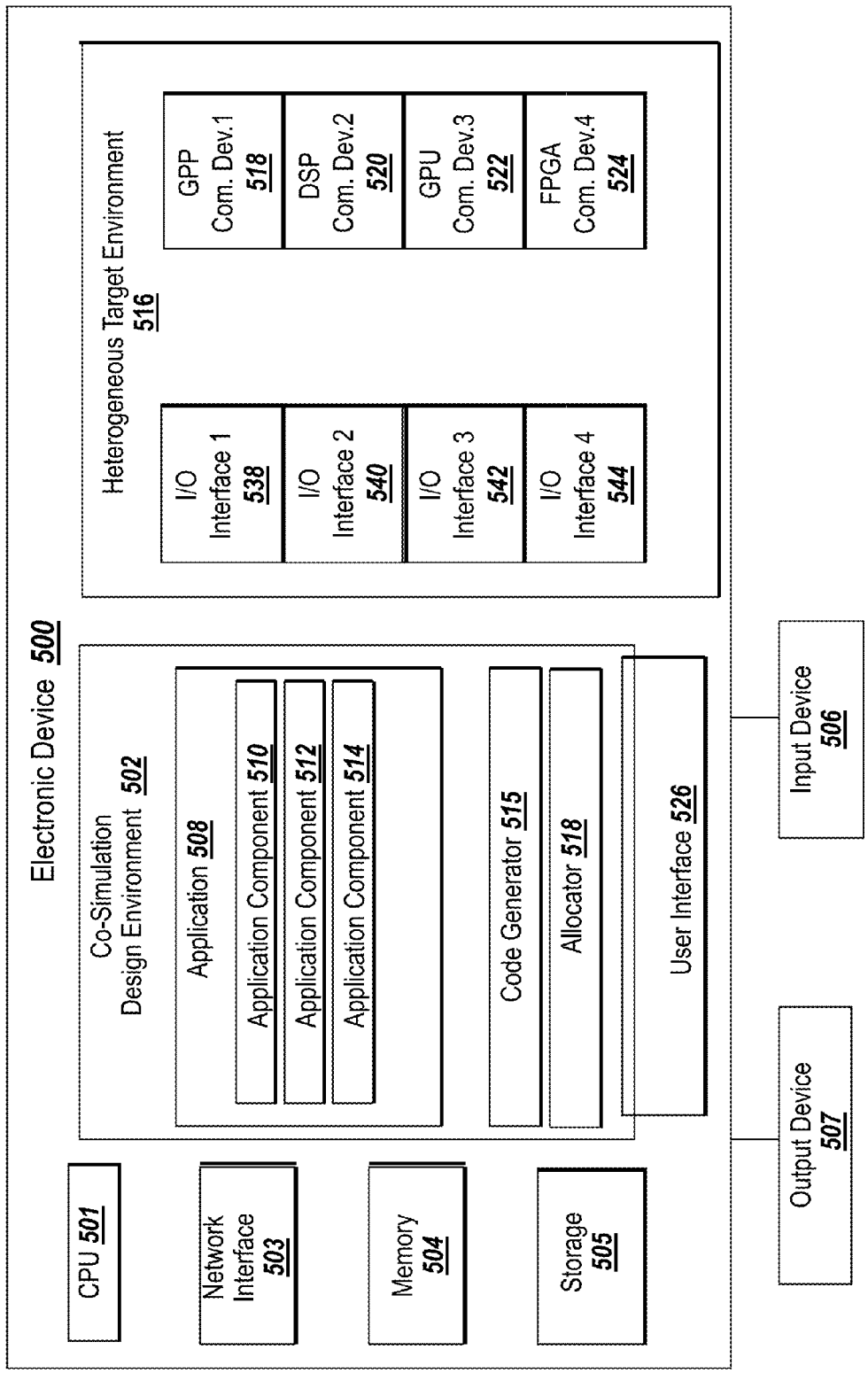
FIG. 5 depicts an exemplary electronic device suitable for practicing exemplary embodiments.

FIG. 5 depicts an exemplary electronic device 500 that may be used to practice an embodiment of the invention. Electronic device 500 is intended to be illustrative and not limiting of the present invention. Electronic device 500 may take many forms, including but not limited to a personal computer, workstation, server, network computer, Internet appliance, mobile device, a pager, a tablet computer, smart phone, etc. Electronic device 500 may include Central Processing Unit (CPU) 501 for executing computer-executable instructions, network interface 503, memory 504, storage 505, etc. CPU 501 may control components of electronic device 500 to provide co-simulation design environment 502. Memory 504 may store instructions and data and provides them to CPU 501.

Optionally, electronic device 500 may include multiple CPUs for executing software loaded in memory 504, and other programs. Each of the CPUs can be a single processing device or may include multiple processing devices on a single board or substrate. The code loaded in memory 504 may run in a virtualized environment, such as in a Virtual Machine (VM). Multiple VMs may be resident on a single processing device. Also, part of the code may be run in hardware, for example, by configuring a field programmable gate array (FPGA), using an application specific instruction set processor (ASIP) using an application specific integrated circuit (ASIC), etc.

Storage 505 can include code for the operating system (OS) of the electronic device 500, code for one or more applications executed by the OS. For example, storage 505 can include applications for the co-simulation design environment 502. Storage 505 may also hold data generated from the co-simulation design environment 502. Those of ordinary skill in the art will appreciate that parts of applications can be stored in the CPU, e.g., CPU cache and/or CPU memory as well, stored on a network-based storage device, etc.

Input device 506 may include a keyboard, mouse, microphone, camera, multipoint touchpad, accelerometer-based device, gyroscope-based device, etc. Electronic device 500 may receive, through input device 506, input data, such as the input data for developing a model, performing a co-simulation, etc. Electronic device 500 may display information on output device 507.

As discussed above, electronic device 500 may host co-simulation design environment 502. For example, electronic device 500 may host a BDE or TPE. The co-simulation design environment 502 may be used to create and test application 508. Application 508 may include one or more of a block diagram, a state-based diagram, a textual program, a technical computing program, etc.

For example, co-simulation design environment 502 may be used to develop a block diagram application or a textual application having executable semantics. Application 508 may have one or more application components, such as application components 510, 512 and 514. Furthermore, co-simulation design environment 502 may include code generator 515. Code generator 515 may be used to generate code that executes on a HTE 516. For example, code generator 515 may generate code for application components 510, 512 and 514 where the generated code is capable of executing on HTE 516. Code generator 515 may be implemented in hardware or a combination of hardware and software.

An allocator 518 for application 508 may be developed in co-simulation design environment 502. Allocator 518 may be an ISA or an IDA. Allocator 518 may implement a mapping that allocates application components 510, 512 and 514 to individual computational devices on HTE 516. For example, HTE 516 may include computational devices, such as but not limited to, a GPP 518, a DSP 520, a GPU 522 and a FPGA 524. It will be appreciated that the number of computational devices depicted in HTE 516 is exemplary and the actual number and types of computational devices in HTEs utilized by embodiments may differ from the number and/or types of devices illustrated in FIG. 5.

Based on the mapping, code for application components 510, 512 and 514 may be allocated to and executed on the designated computational devices 518, 520, 522 and 524 during a co-simulation of application 508. For example, application component 510 may be allocated to execute on GPP 518. Application component 512 may be allocated to execute on DSP 520. Application component 514 may be allocated to execute on GPU 522. The mapping may maintain data synchronization within application 508, and across application components 510, 512 and 514. That is, if application 508 includes multiple copies of a dataset, application 508 may be allocated to execute such that the multiple copies are kept in synchronization with one and other, and therefore data integrity is maintained. Component synchronization primitives may be implemented to maintain data synchronization.

HTE 516 may include one or more I/O interfaces 538, 540, 542, 544 that may be used when computational devices 518, 520, 522 and 524 communicate with each other. According to various embodiments, a user may assign an I/O interface to each application component 510, 512 and 514. Thus, when application components 510, 512 and 514 execute on allocated computational devices 518, 520, 522 and 524, the communication between computational devices 518, 520, 522 and 524 is established using I/O interfaces 538, 540, 542, 544 according to determinations made by the user. In some embodiments, the user may assign I/O interfaces 538, 540, 542, 544 to application components 510, 512 and 514 while application components 510, 512 and 514 are executing on allocated computational devices 518, 520, 522 and 524. Other embodiments may allow a single I/O interface to be assigned to multiple computational devices operating on HTE 516.

It will be appreciated that application 508 can contain at least one application component that is simulated in co-simulation design environment 502 while other application components from application 508 are executed on HTE 516.

During a co-simulation of application 508, HTE 516 may generate profiling results corresponding to the execution of application 508 on HTE 516. HTE 516 may provide the profiling results to co-simulation design environment 502 in real-time during run-time or execution time. Profiling results may include performance statistics associated with the computational devices of HTE 516. For example, profiling results may include, but are not limited to, metrics and/or run-time or execution-time statistics associated with the execution of application 508 on HTE 516. Exemplary profiling results may include processor load (a metric associated with the execution utilization of a computational device), memory usage, power consumption, stack usage, cache utilization (e.g., hit/miss statistics), latency information, etc. Profiling results may also include metrics relating to a buffer allocation, algorithm data synchronization, inter-algorithm wait times, resource utilization by applications, execution priorities of applications, power consumption information, a gate count, a transaction count, a processing element count, etc. Different computational devices may have different metrics. For example, metrics associated with computational device 518 may differ from metrics associated with computational device 520.

A user of co-simulation design environment 502 may output profiling results via user interface 526. According to various embodiments, user interface 526 may include a graphical user interface (GUI) or an application programming interface (API). In an embodiment, user interface 526 may be provided via output device 507 in communication with electronic device 500. Based on the review, the allocation scheme of allocator 518 may be varied during the execution of application 508. In an embodiment, input device 506 may be used to interact with user interface 526. The allocation scheme may be interactively varied without halting execution of application 508.

Factoring an Application into Application Components

According to various embodiments, application components may be formed by grouping, e.g., factoring together, various components of application 508. FIGS. 6A-6D depict an exemplary technique for factoring an application into application components within a BDE.

Figure 6A:
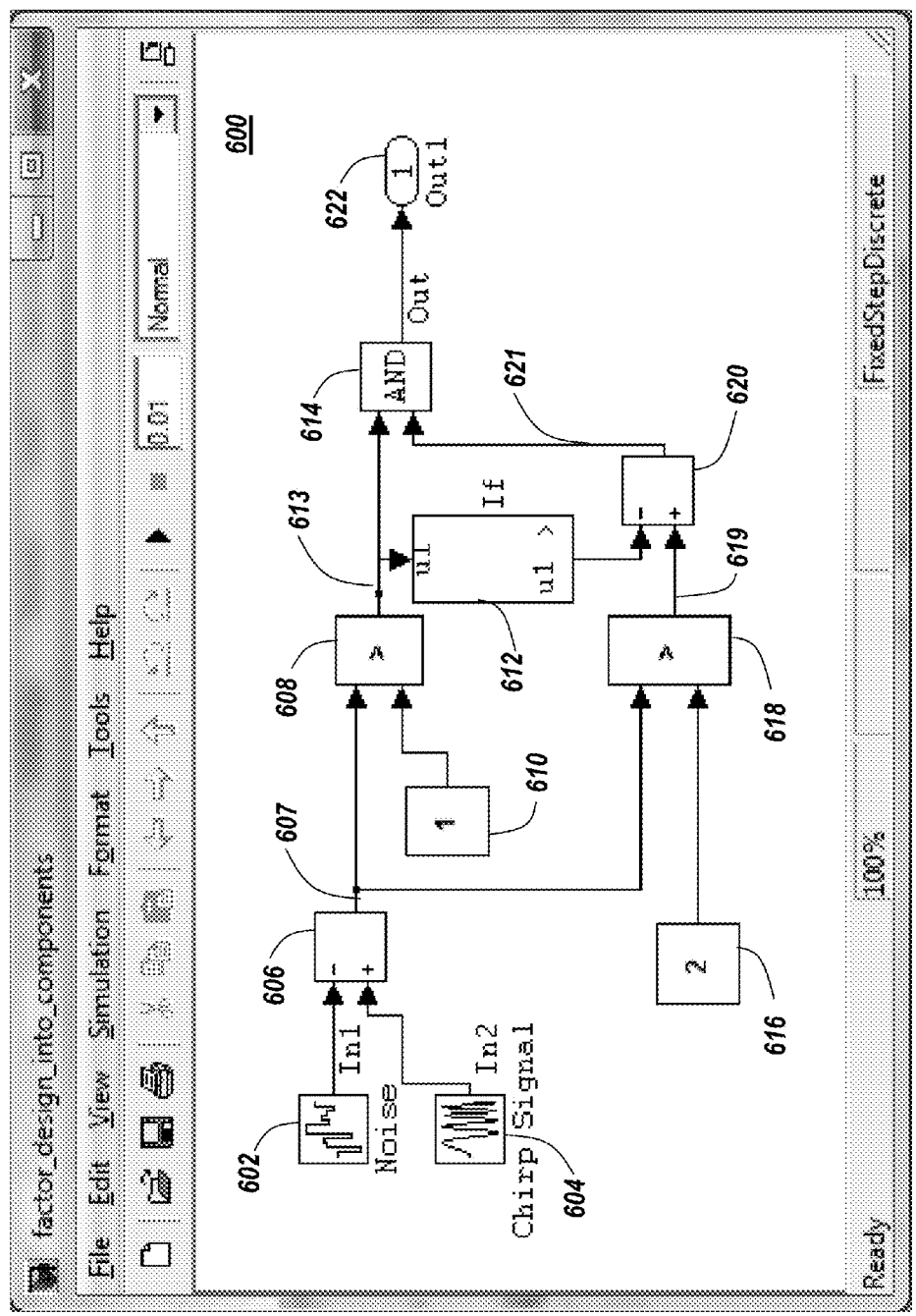
FIG. 6A depicts an exemplary application in the form of a block diagram environment (BDE) model.

FIG. 6A includes a block diagram model 600. Block diagram model 600 includes noise input 602, chirp signal input 604 and constant input 616. Noise input 602 and chirp signal input 604 are fed into adder block 606 where the sum of noise input 602 and chirp signal input 604 is calculated. The sum value is output from block 606 as output signal 607. Output signal 607 is compared to a first constant signal 610 at block 608. Block 608 outputs the signal having the highest value of output signal 607 and first constant signal 610 as output 613. Output signal 607 is also compared to a second constant signal 616 at block 618. Block 618 outputs the larger of output signal 607 and second constant signal 616 as output 619.

Output signal 613 is fed into if-block 612. If output signal 613 satisfies the condition specified in the if-block 612, output signal 613 is added with output signal 619 at adder block 620. The output 621 of adder block 620 is fed into block 614 which may contain a Boolean expression such as 'AND'. Output signal 613 is also fed into block 614. The output of block 614 may be generated as the final output 622 of the block diagram model 600 illustrated in FIG. 6A. Block diagram model 600 may be an executable block diagram model that represents a dynamic system that can be simulated on target hardware. Additionally, block diagram 600 may be factored according to a received instruction. The factorization of block diagram 600 is illustrated in FIGS. 6B-6C.

Figure 6B:
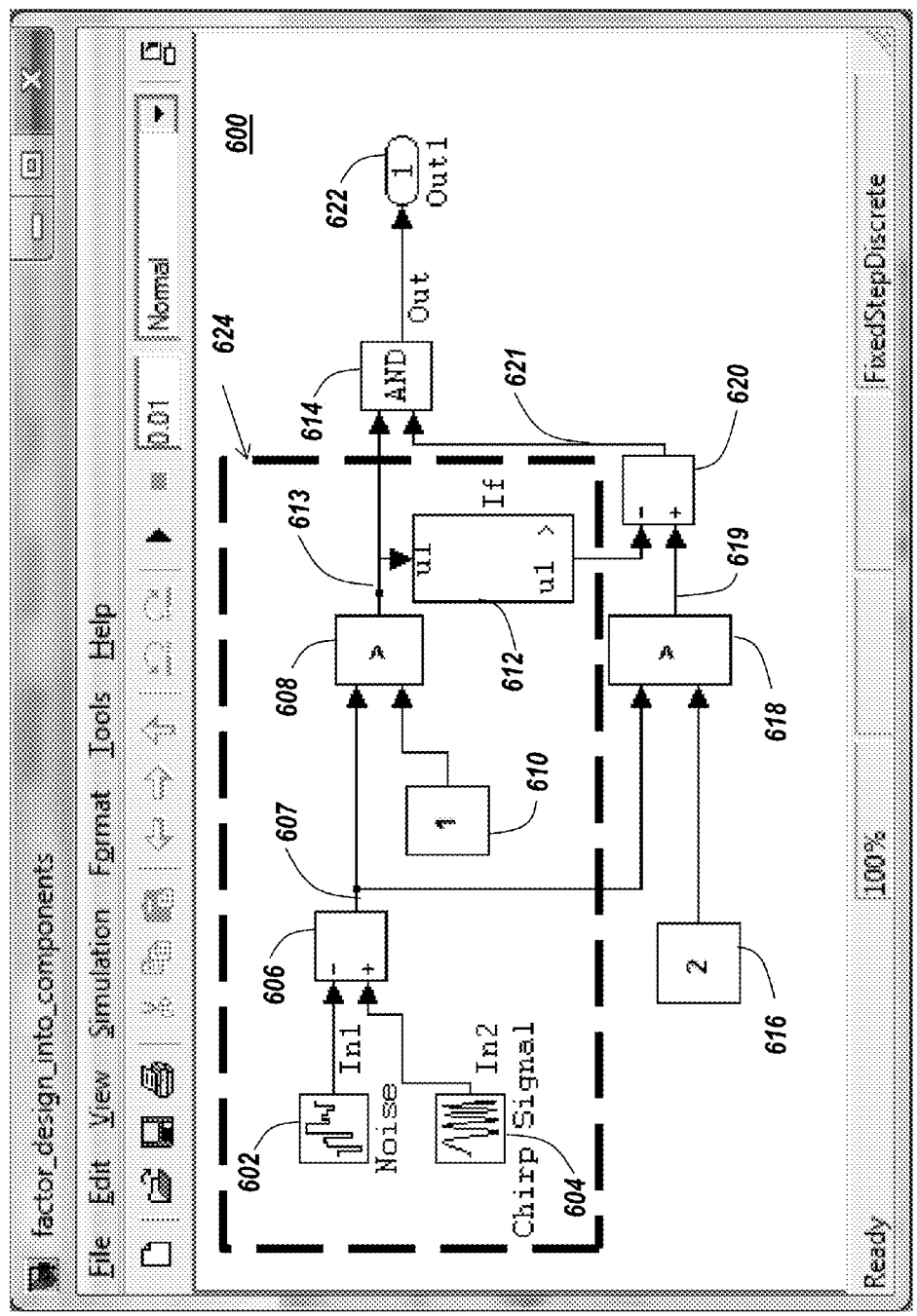
FIGS. 6B-6C depict elements of the exemplary BDE model illustrated in FIG. 6A being factored into application components.

As illustrated in FIG. 6B, blocks 602, 604, 606, 608, 610, and 612 may be grouped together to form a first factored region 624. Region 624 includes blocks 602, 604, 606, 608, 610 and 612 and may represent a group. Blocks 614, 616, 618, 620 and 622 of block diagram 600 remain outside region 624 and thus are not part of the group. Grouping of the elements illustrated in FIG. 6B is for illustrative purposes and should not be construed as limiting. In an embodiment, region 624 can be demarcated using, e.g., a dashed border.

Figure 6C:
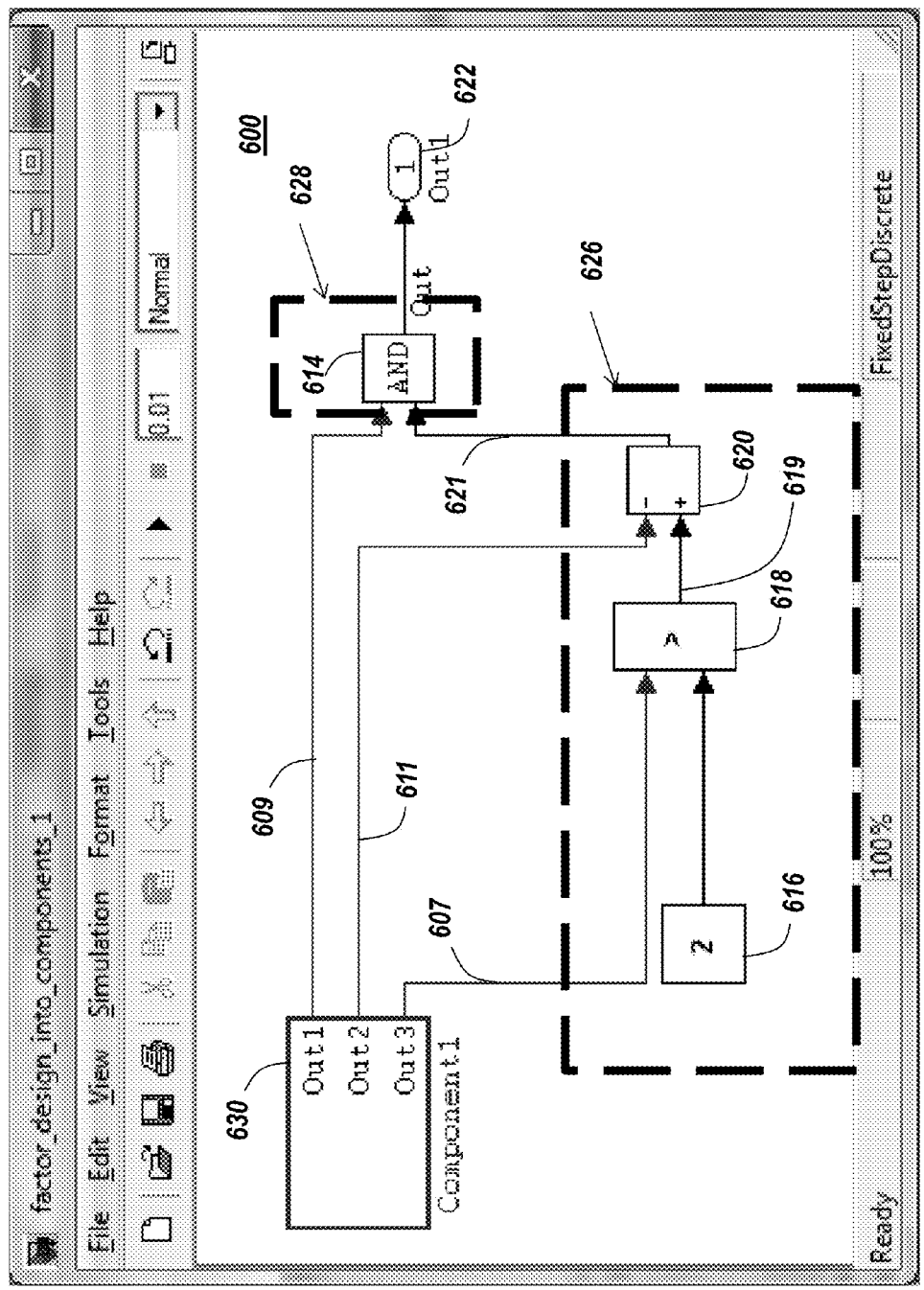

In FIG. 6C, the group within region 624 is designated as application component 630 in block diagram 600. Use of application component 630 to represent blocks 602, 604, 606, 608, 610, and 612 does not alter the design or operation of block diagram 600. As illustrated in FIG. 6B, three outputs 607, 609 and 611 leave the demarcated boundary of application component 630. These three outputs 607, 609, 611 are maintained as output signals of application component 630 in FIG. 6C. FIG. 6C further illustrates an additional grouping of blocks 616, 618 and 620 using second factored region 626 and denoted by the dashed border in the lower portion of FIG. 6C. Similarly, block 614 is included in third factored region 628 and denoted by the dashed border in the upper right portion of FIG. 6C.

Figure 6D:
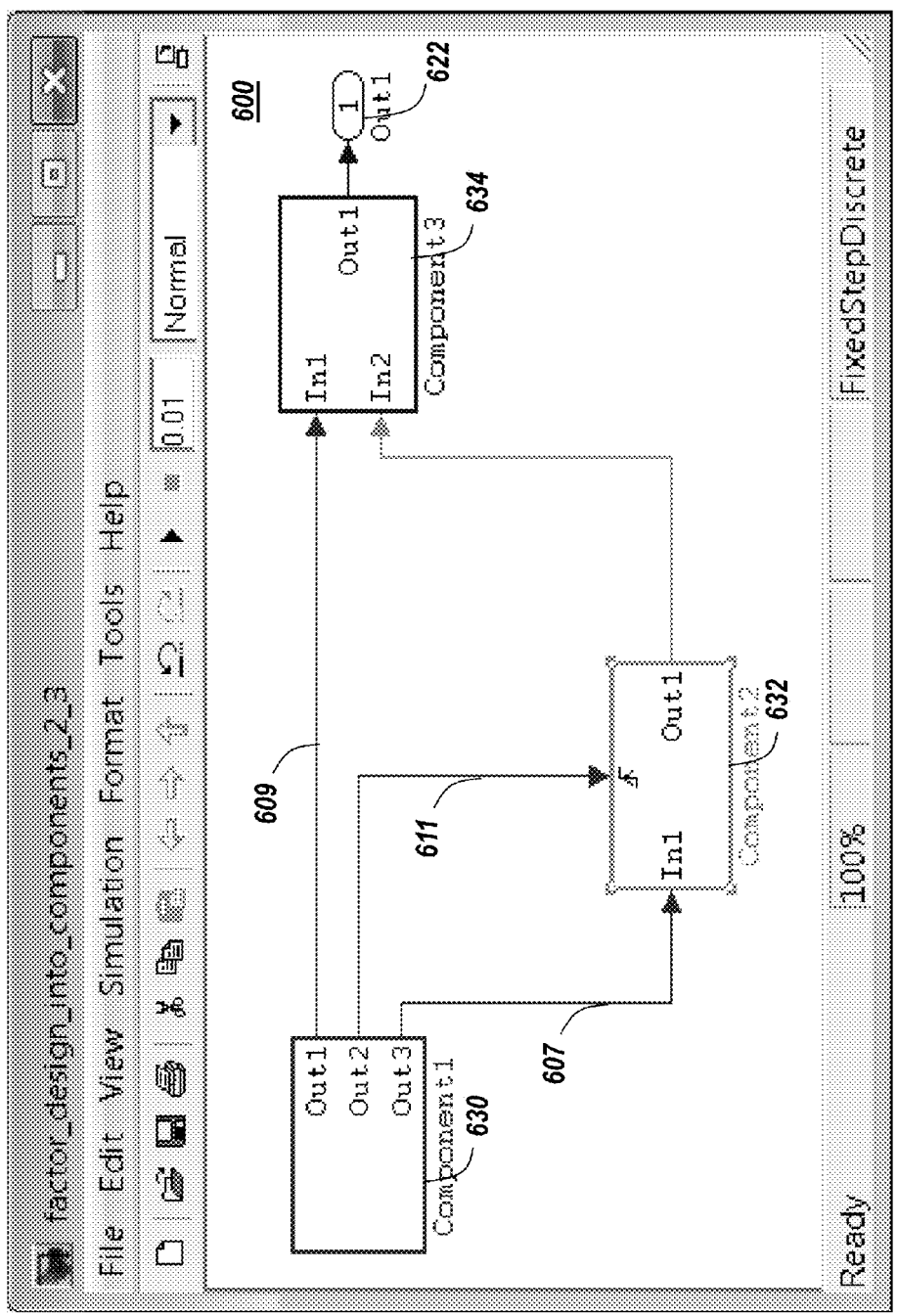
FIG. 6D depicts the exemplary BDE model illustrated in FIG. 6A using the application components illustrated in FIGS. 6B-6C.

According to various embodiments, factoring may break components of an application into groups according to criteria. FIG. 6D illustrates a block diagram 600 that has been factored. Blocks 616, 618 and 620 are designated as application component 632. Block 614 is designated as application component 634.

According to various embodiments, a factored application may be re-factored during co-simulation. For example, application component 630 may be divided into two separate components. Blocks 602, 604, 606 may be grouped to form a first component C1 and blocks 608, 610, and 612 may be grouped to form a second component C2. Accordingly, a re-factored version of block diagram 600 may include application components C1, C2, 632 and 634.

Application components of application 600 may be executed on a HTE using an ISA or an IDA.

Interactively Changing Allocation Scheme During Co-Simulation

Figure 7A:
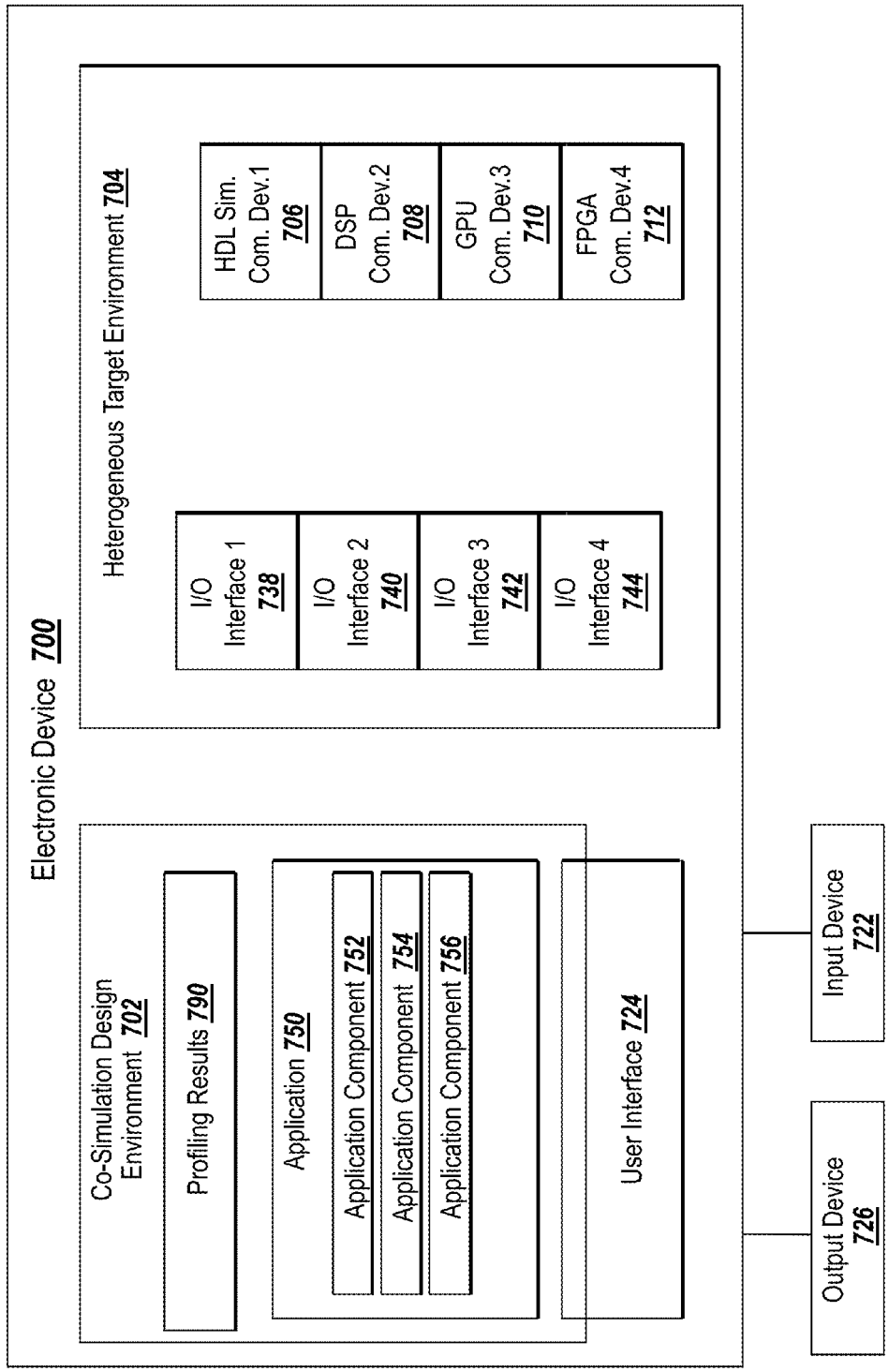
FIG. 7A depicts an exemplary environment for executing an exemplary BDE model in an exemplary target environment.

FIGS. 7A-7E illustrate an exemplary implementation where an allocation scheme for application 750 is interactively changed during co-simulation. FIG. 7A depicts electronic device 700, which includes co-simulation design environment 702 and HTE 704. Application components 752, 754 and 756 are provided in co-simulation design environment 702. HTE 704 includes four computational devices: computational device, e.g. HDL simulator, 706; computational device, e.g. DSP, 708; computational device, e.g. GPU, 710; and computational device, e.g. FPGA, 712. HTE 704 further includes I/O interfaces 738, 740, 742, 744. The user may assign one or more I/O interfaces 738, 740, 742, 744 to application components 752, 754 and 756. During co-simulation, computational devices 706, 708, 710, 712 executing application components 752, 754 and 756 may use assigned I/O interfaces 738, 740, 742, 744 to communicate among themselves, for example, to exchange data during co-simulation.

Figure 7B:
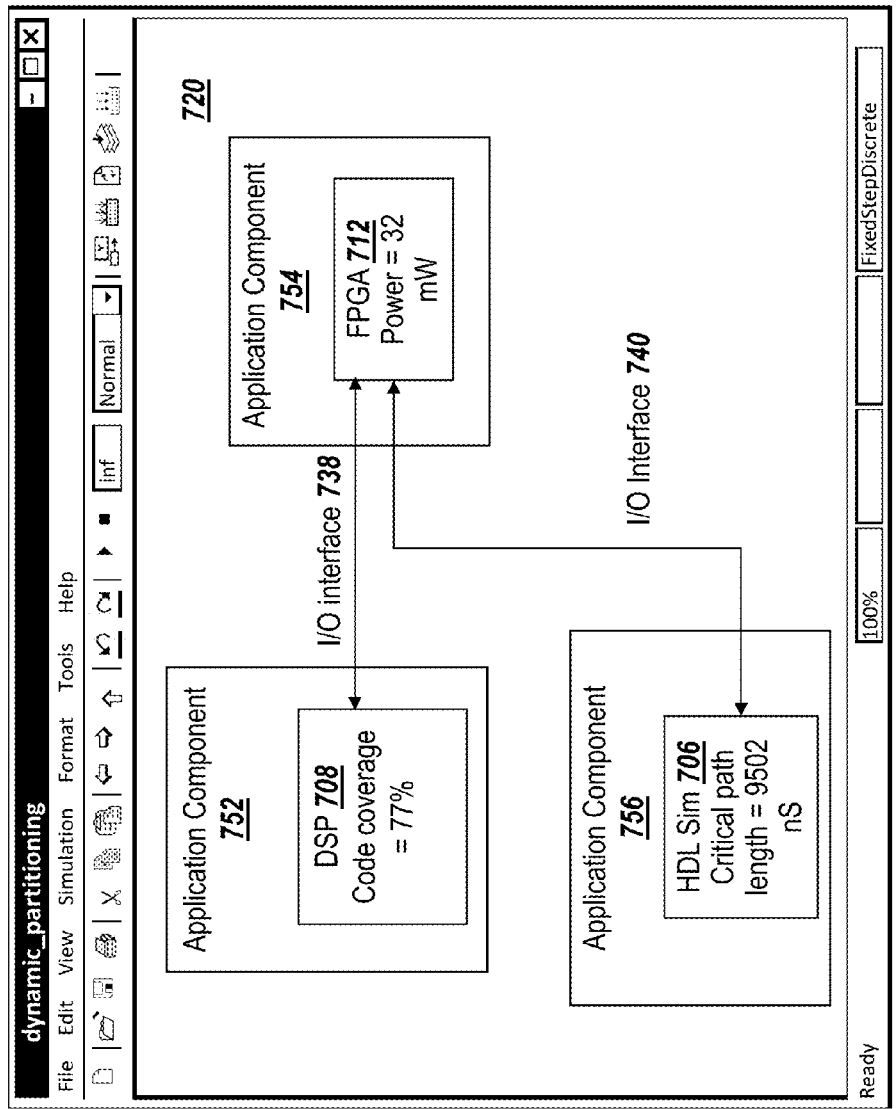
FIG. 7B depicts an exemplary allocation scheme for the BDE model illustrated in FIG. 7A.

FIG. 7B illustrates an exemplary allocation scheme 720. According to allocation scheme 720, execution of application component 752 may be allocated to computational device 708, execution of application component 754 may be allocated to computational device 712, and execution of application component 756 may be allocated to computational device 706. Computational device 708 may communicate with computational device 712 via I/O interface 738 and computational device 706 may communicate with computational device 712 via I/O interface 740. In the illustrated exemplary allocation scheme 720, there may be no need for computational device 706 to communicate with computational device 708. Accordingly, an I/O interface may not be designated between computational device 706 and computational device 708.

According to various embodiments, profiling results 790 may be generated during execution of application 750 and provided to co-simulation design environment 702 from HTE 704 in real-time, i.e., while application 750 is executing. Relevant profiling results may be displayed in connection with associated application components 752, 754, 756. FIG. 7B illustrates profiling results associated with the execution of application components 752, 754, 756 on computational devices 708, 712, 706, respectively. The profiling results are displayed in corresponding computational devices 708, 712, 706. As illustrated, different computational devices may have different metrics. For example, the metric for DSP 708 is code coverage and the displayed profiling result indicates that the code coverage was 77% in connection with the execution of application component 752. The metric for HDL simulator 706 is critical path length and the displayed profiling result indicates that the critical path length was 9502 nanoseconds (nS) in connection with the execution of application component 756. The metric for FPGA 712 is power consumption and the displayed profiling result indicates that the power consumption was 32 milliwatts (mW) in connection with the execution of application component 754. Profiling results 790 are discussed below in greater detail.

During co-simulation, exemplary allocation scheme 720 can be modified by reallocating application components to different computational devices for execution. For example, an input may be received via input device 722 and allocation scheme 720 may be changed based on the received input.

Figure 7C:
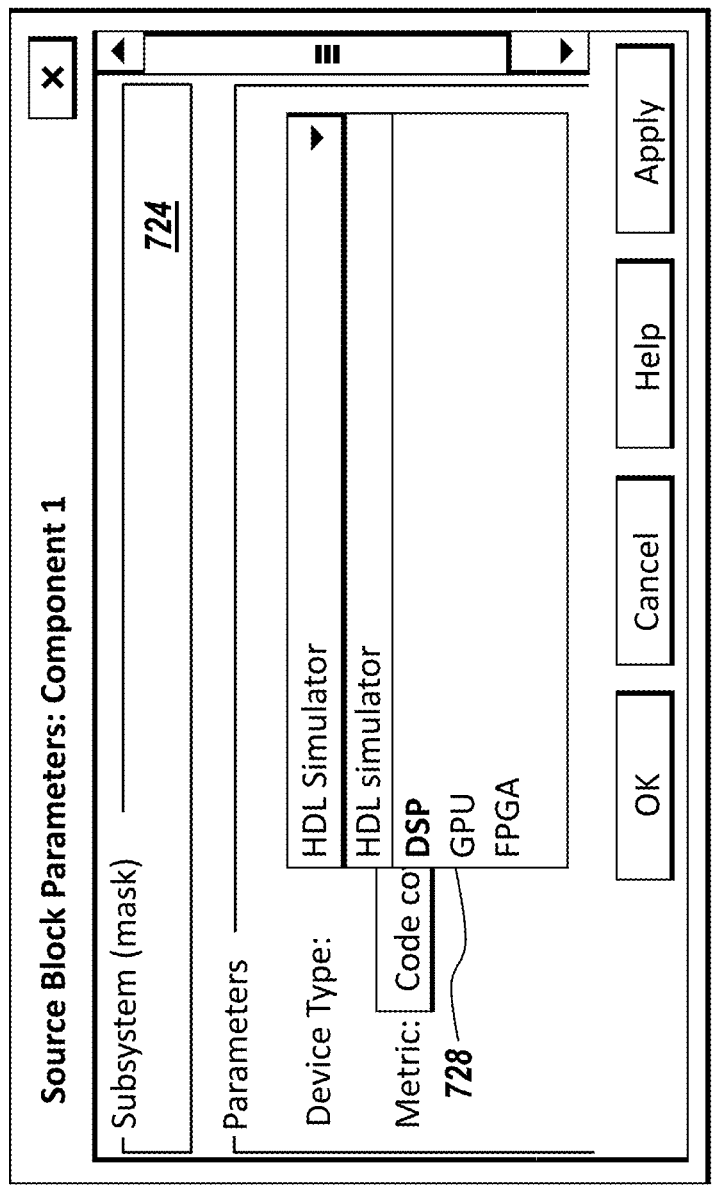
FIG. 7C depicts an exemplary user interface for modifying the allocation scheme illustrated in FIG. 7A.

FIG. 7C illustrates an exemplary GUI as user interface 724. User interface 724 can be used to change the execution of application component 754 from a currently selected HDL simulator 706 to another computational device via graphical affordance 728. Graphical affordance 728 may include, for example, a button, a dropdown menu, a list, etc. Embodiments may allow the change to be made from co-simulation design environment 702.

For example, selecting a computational device on graphical affordance 728 of user interface 724 may transfer execution of application component 754 from HDL simulator 706 to DSP 708 when application component 754 is next invoked (i.e., the next time application component 754 runs). It should be noted that co-simulation may not need to be stopped during the computational device selection and execution transfer processes. That is, the execution of application component 754 is transferred from HDL simulator 706 to another computational device without re-generating, re-compiling or re-running code for application component 754 or application components 752 and 756.

Figure 7D:
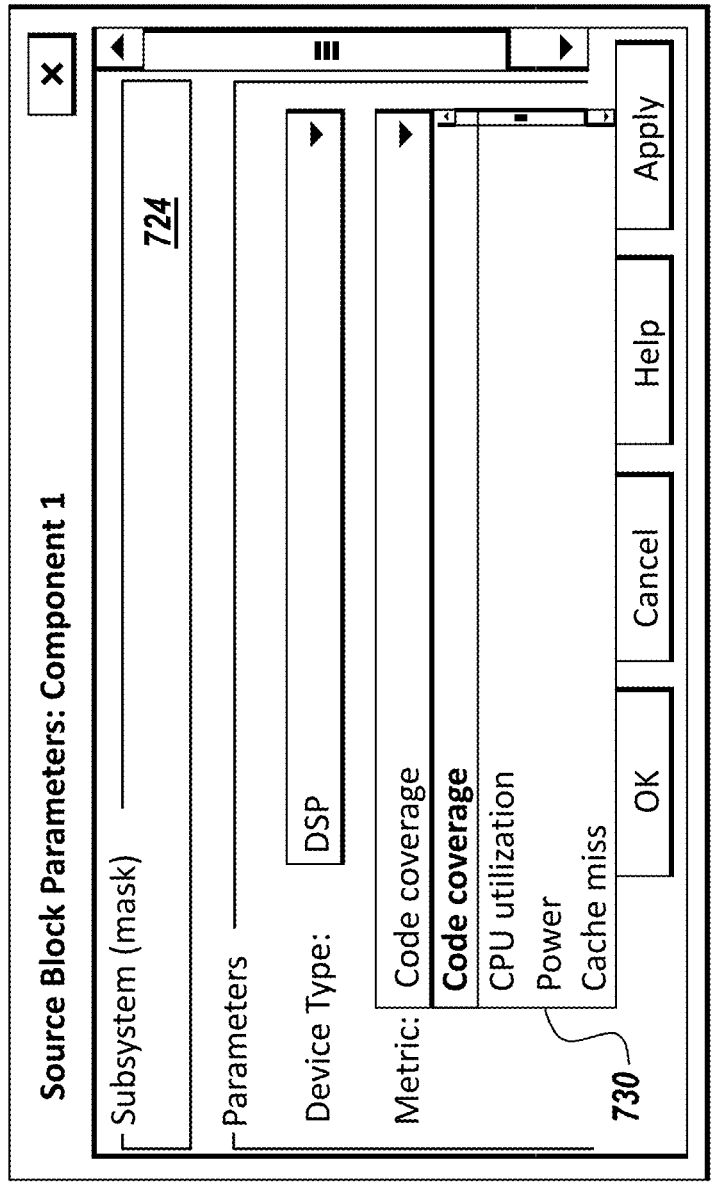
FIG. 7D depicts an exemplary user interface for selecting metrics associated with the computation device selected using the exemplary user interface illustrated in FIG. 7B.

FIG. 7D illustrates an embodiment of user interface 724 that can be used to select an appropriate metric for a computational device selected in FIG. 7C. For example, graphical affordance 730 may be used to select the metric associated for a selected computational device, i.e. DSP 708. Graphical affordance 730 may include, for example, a button, a dropdown menu, a list, etc. For example, code coverage may be selected as the profiling metric. When application component 754 is executed on DSP 708, the profiling may be conducted based on code coverage. Profiling results may be displayed using output device 726 and in connection with DSP 708.

Figure 7E:
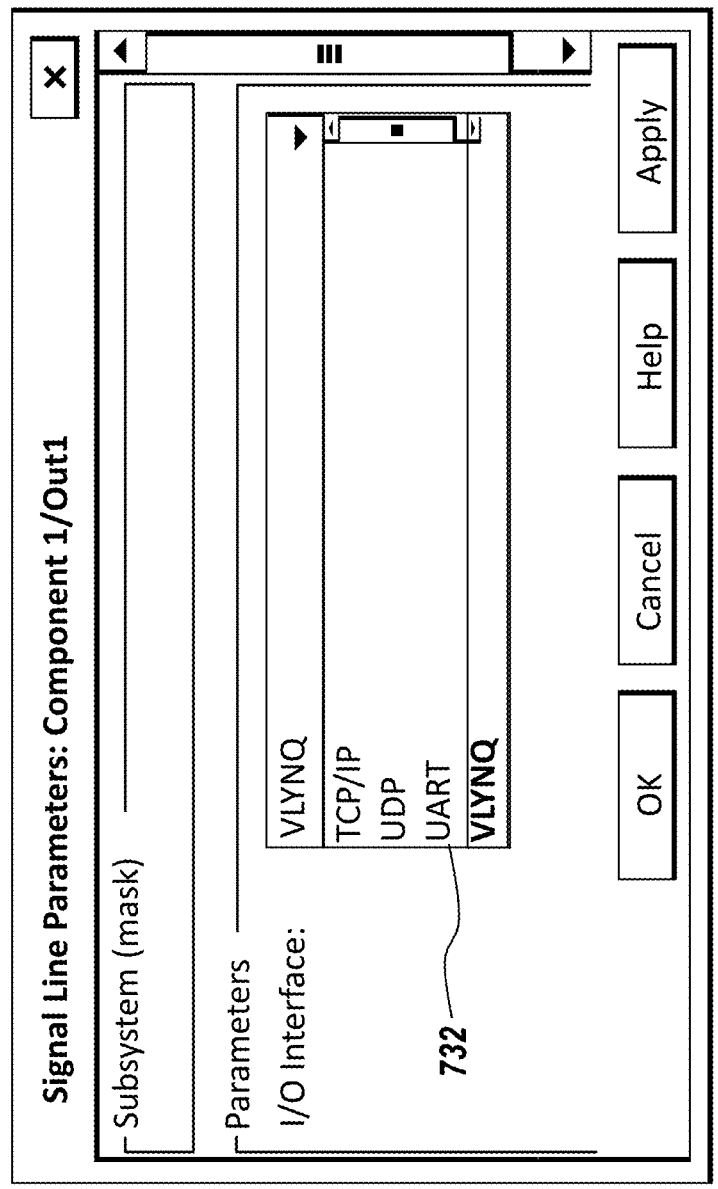
FIG. 7E depicts an exemplary user interface for selecting I/O interfaces associated with the computation device selected using the exemplary user interface illustrated in FIG. 7A.

Two or more of the computational devices in the HTE may be connected by an input/output (I/O) interface that allows for the transfer of data between the connected devices. User interface 724 may further be used to select an appropriate I/O interface for a connection between two computational devices, or a connection between an input device and a computational device, or a connection between a computational device and an output device. For example, the I/O interface 738 that connects DSP 708 and FPGA 712 may be selected for a computational device via graphical affordance 732, as illustrated in FIG. 7E. Graphical affordance 732 may include, for example, a button, a dropdown menu, a list, etc. For example, VLYNQ may be selected as the I/O interface using graphical affordance 732. Accordingly, DSP 708 may communicate with FPGA 712 and/or with other computational devices at target environment 704 via I/O interface VLYNQ.

Figure 7F:
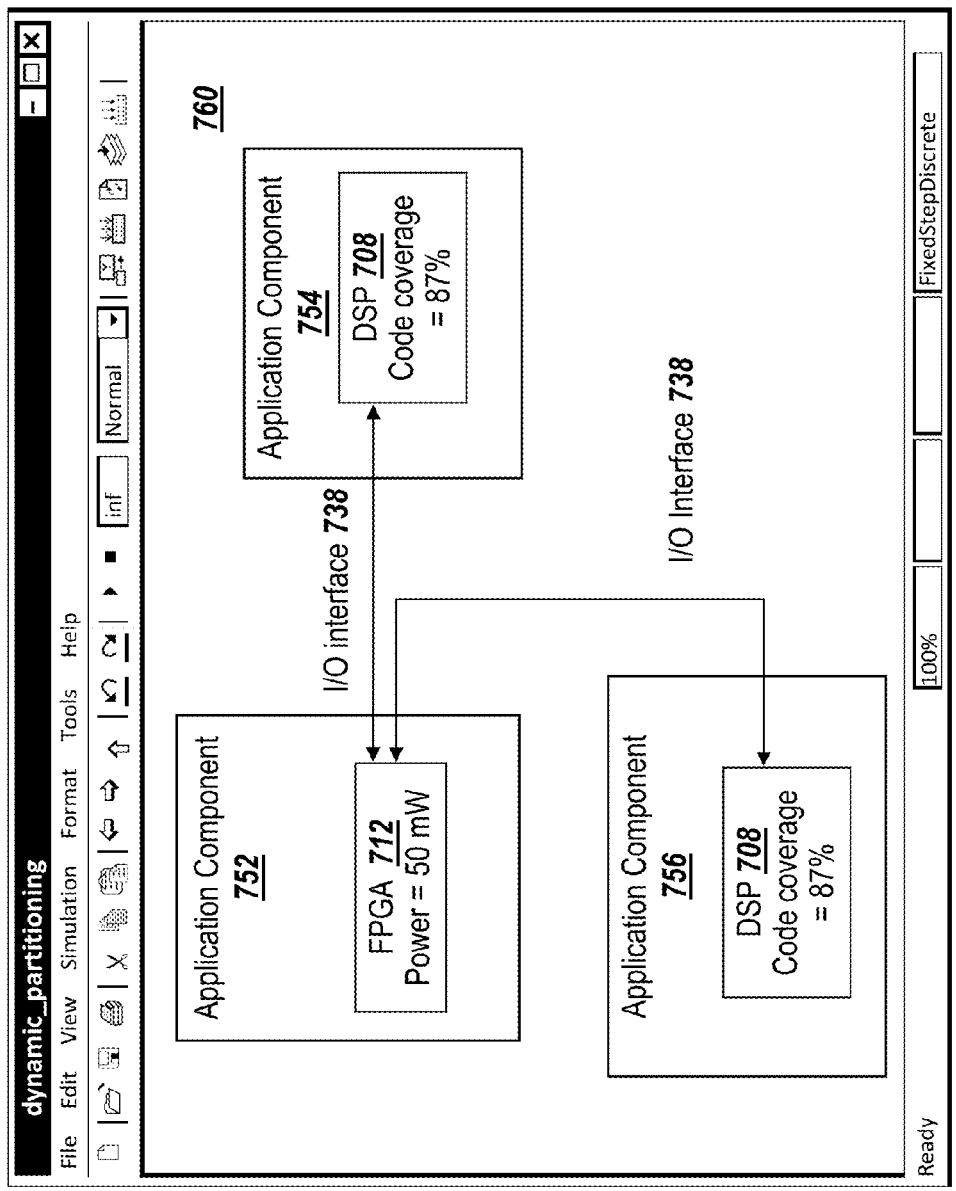
FIG. 7F depicts an exemplary modified allocation scheme for the BDE model illustrated in FIG. 7A.

FIG. 7F illustrates an exemplary modified allocation scheme 760 relative to the original allocation scheme 720 shown in FIG. 7B. According to allocation scheme 760 illustrated in FIG. 7F, application component 752 is allocated to FPGA 712 and both application components 754 and 756 are allocated to DSP 708. No application component is allocated to HDL 706 or GPU 710. DSP 708 may communicate with FPGA 712 via I/O interface 738.

As illustrated in FIG. 7F, profiling results for DSP 708 indicate that the code coverage is 87% and the power consumption associated with FPGA 712 is 50 mW. While modified allocation scheme 760 alters which application components 752, 754, 756 are executed on which computational devices 706, 708, 710, 712, modified allocation scheme 760 does not stop execution of application components 752, 754, 756. Modifying mapping of application components 752, 754, 756 from allocation scheme 720 to allocation scheme 760 does not require stopping application execution nor does it require re-generating, re-compiling and/or re-running code for application components 752, 754, 756.

As provided above, an interactive static allocator or a co-simulation dynamic allocator may be used to modify the allocation scheme allocating the execution of code associated with application components to computational devices on the HTE. That is, an interactive static allocator or a co-simulation dynamic allocator may be used to re-allocate the execution of code associated with application components to different computational devices on the HTE during co-simulation.

Modifying an allocation scheme as illustrated in FIGS. 7A-7F provides improvements, such as but not limited to, improved load balancing on the HTE, faster execution of the application, improved processing efficiency and optimal memory usage. In an embodiment, a best or optimum allocation of application components to computational devices may be determined using real-time information, such as statistics about the computational devices processing the application components, to better determine which modifications may improve processing efficiency among the computational devices. For example, profiling results such as relevant run-time or execution-time statistics, such as computational load and memory usage, may be streamed back to the co-simulation design environment from the HTE in real time, i.e. while the code for the application components is being executed on the HTE. Accordingly, it may be beneficial to provide relevant run-time or execution-time statistics to the co-simulation design environment.

Profiling Results

According to various embodiments, the HTE may send continuous run-time or execution-time statistics updates to the co-simulation design environment. As further illustrated in FIG. 7A, profiling results 790 may be generated during execution of application 750 and provided to co-simulation design environment 702 from HTE 704 in real-time, i.e., while application 750 is executing. Profiling results may be sent to co-simulation design environment 702. Profiling results may include performance statistics associated with computational devices 706, 708, 710, 712 of HTE 704.

For example, profiling results 790 may include, but are not limited to, metrics and/or run-time or execution-time statistics associated with the execution of application 750 on HTE 704. Exemplary profiling results 790 may include processor load (a metric associated with the execution utilization of a computational device), memory usage, power consumption, stack usage, cache utilization (e.g., hit/miss statistics), etc. Profiling results 790 may also include metrics relating to a buffer allocation, algorithm data synchronization, an inter-algorithm wait time, resource utilization by other applications and the execution priorities of those applications.

A portion of the profiling results may be provided in various graphical and/or textual formats, if desired. For example, profiling results 790 may be provided on output device 726. Based on the profiling results, changes may be made to the interactive static or dynamic allocation scheme to improve execution efficiency of the code. The execution efficiency of the code may include, but is not limited to, increasing execution speed, minimizing memory usage, minimizing power consumption, improving load distribution across computational devices, minimizing power consumption, minimizing communication among the computational devices, etc. For example, the user may change the allocation scheme of application components 752, 754, 756 to computational devices 706, 708, 710, 712 using user interface 724 via input device 722 for faster execution or to better meet application design constraints.

According to various embodiments, relevant run-time or execution-time statistics may be provided in the co-simulation design environment and back-annotated to corresponding application components. For example, run-time or execution-time statistics associated with each application component may be displayed in the co-simulation design environment along with the corresponding application component.

Figure 8A:
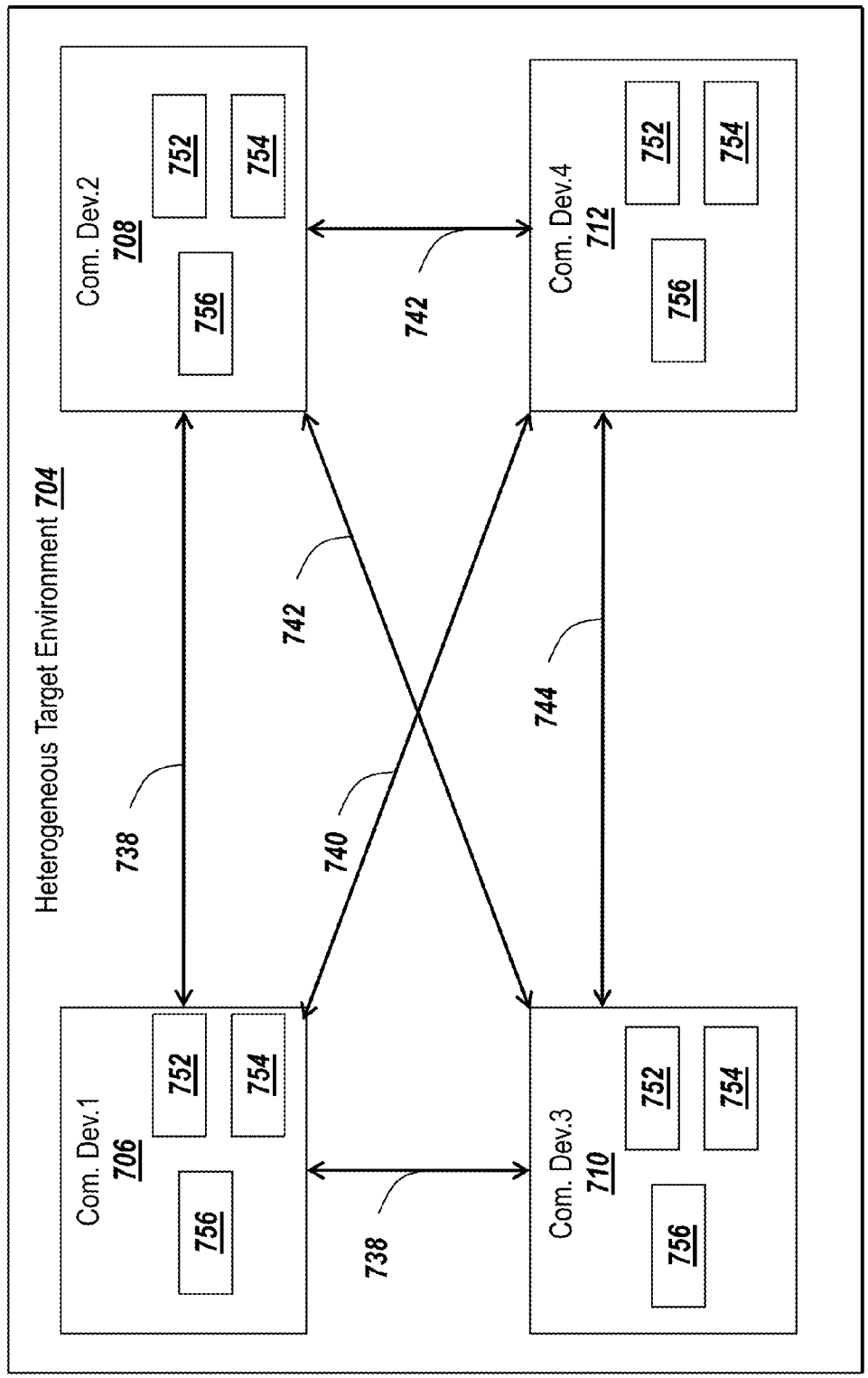
FIGS. 8A and 8B depict an exemplary target environment where one or more components on one or more computational devices can be enabled or disabled.

Enabling/Disabling Execution of Application Components on the Computational Devices FIG. 8A depicts an exemplary embodiment where all application components 752, 754, 756 are assigned to each of the available computational devices 706, 708, 710, 712 of HTE 704. The details of HTE 704 and computational devices 706, 708, 710, 712 are discussed above in connection with FIG. 7A. As illustrated in FIG. 8A, computational devices 706, 708, 710, 712 may communicate with each other via I/O interfaces 738, 740, 742, 744. As shown in FIG. 8A, one or more pairs of computational devices 706, 708, 710, 712 may use a same I/O interface 738, 740, 742, 744. For example, computational device 706 may communicate with computational device 708 via I/O interface 738. Computational device 706 may also communicate with computational device 710 via I/O interface 738.

In the exemplary embodiment illustrated in FIG. 8A, all application components 752, 754, 756 may be assigned to each of computational devices 706, 708, 710, 712. The allocation scheme may enable or disable the execution of the application components 752, 754, 756 on computational devices 706, 708, 710, 712.

Figure 8B:
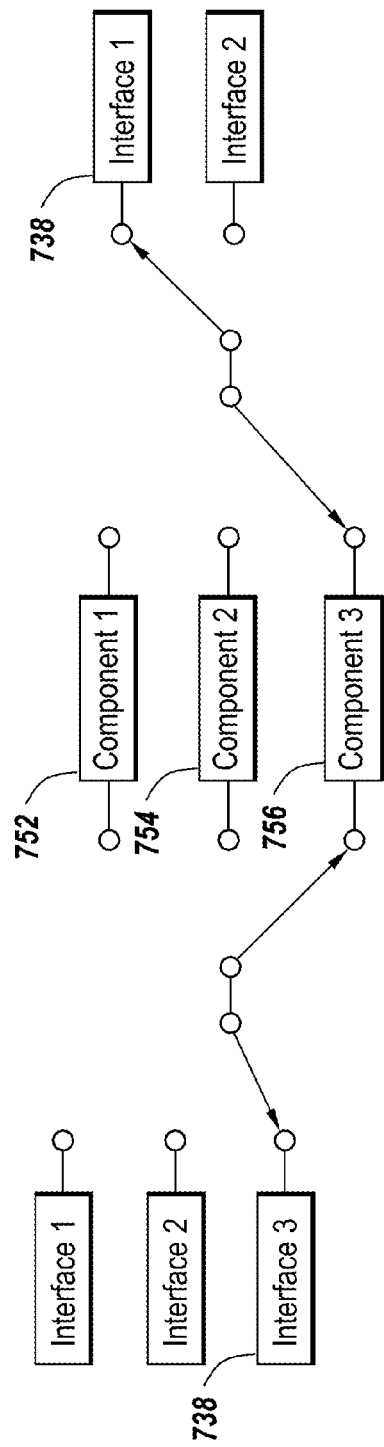

FIG. 8B illustrates computational device 706 where all application components 752, 754, 756 are assigned thereto. Computational devices 708, 710, 712 may have a structure similar to that of computational device 706 illustrated at FIG. 8B. An allocation scheme may indicate that one or more of the application components 752, 754, 756 will be executed by computational device 706, while other application components will be executed by other computational devices 708, 710, 712. Accordingly, the application components 752, 754, 756 may be enabled and/or disabled on computational device 706 based on the allocated scheme. The application components that will execute on computational device 706 may be enabled by being lined to appropriate I/O interfaces.

For example, application component 756 is allocated to execute on computational device 706. Therefore, application component 756 is linked to corresponding I/O interface 738 to enable execution of application component 756 on computational device 706. Computational device 706 may communicate with one or more of other computational devices 708, 710, 712 via I/O interface 738 while executing application component 756. If any other application component 752, 754 is allocated for execution on computational device 706, I/O interfaces may be linked to the other application components 752, 754 as well. In some embodiments, more than one application component may be linked to a same I/O interface.

Generating a Conventional Allocator Using Interactive Allocator(s)

Figure 9:
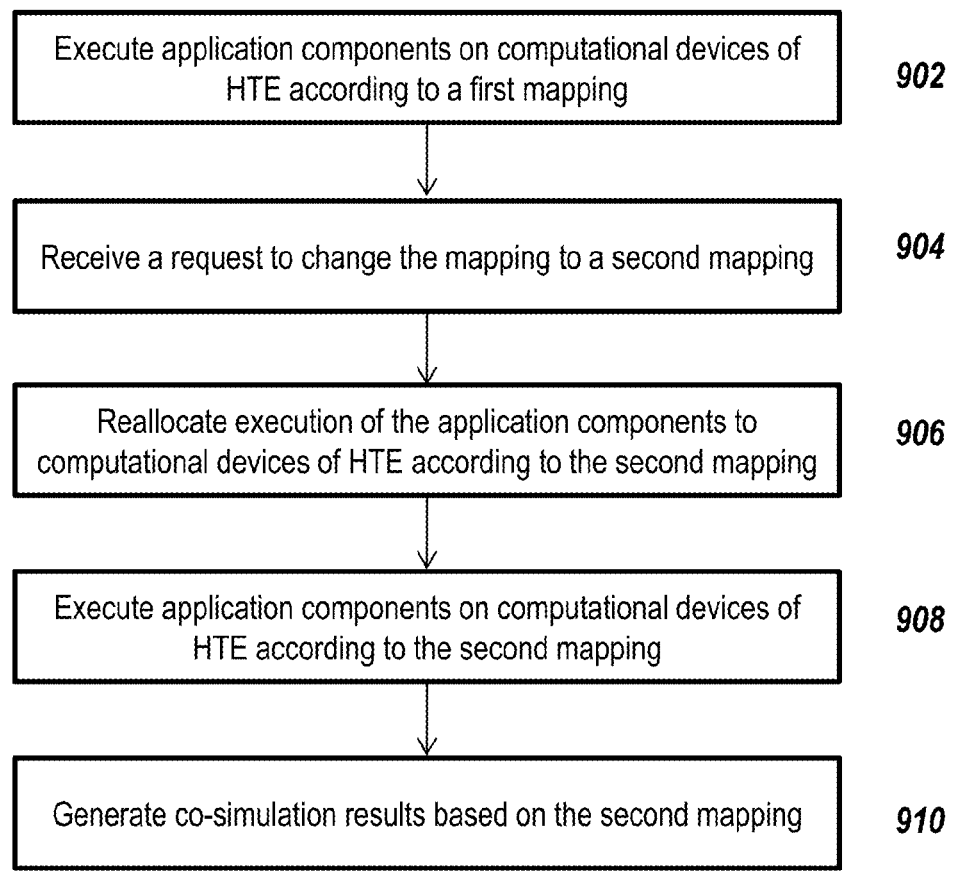
FIG. 9 is a flowchart illustrating exemplary processing for reallocating execution of application components on a HTE during co-simulation of an application.

FIG. 9 is a flowchart illustrating exemplary processing for practicing an embodiment in a BDE or TPE so as modify a mapping between the application components of an application provided in a co-simulation design environment and computational devices of a HTE.

In FIG. 9 processing may begin by executing application components of an application provided in a co-simulation design environment on computational devices of a HTE according to a first mapping (block 902). The application may be co-simulated by executing some application components in the co-simulation design environment and executing other application components on the HTE using the assigned computational device(s). For example, in one embodiment, default settings may initially allocate all application components to one computational device of the HTE. Allocating all application components to execute on a single computational device may predict the processing time (computational load) of each application component. However, such allocation may not predict the potential I/O wait times if dependent data were to come from a different computational device (i.e., wait times caused by inter-algorithm communications and synchronization). As a result, in other embodiments, the application components may be allocated to multiple computational devices rather than all of the components being assigned to execute on the same computational device.

A request for changing the mapping to a second mapping may be received at the co-simulation design environment (block 904). Processing allows for interactively changing the allocation scheme by reallocating one or more application components to available computational devices during co-simulation (block 906). Re-allocation of execution of the application components to available computational devices according to a second mapping, i.e. a modified allocation scheme. The interactive changing of allocation scheme occurs without a user or program first having to re-generate, re-write, re-compile, re-link, re-download and/or re-run the application code.

Processing may proceed by executing the reallocated application components on the computational devices of the HTE according to the second mapping (block 908). Embodiments may allow for implementing application components deployed as algorithms of execution in a multi-algorithm process.

Co-simulation results may be generated based on the second mapping of the application components to computational devices of the HTE (block 910).

The processing described above in reference to FIG. 9 illustrates an exemplary sequence in which the mapping between application components and computational devices is modified during co-simulation without first having to re-generate, re-write, re-compile, re-link, re-download and/ or re-run the application code.

Figure 10:
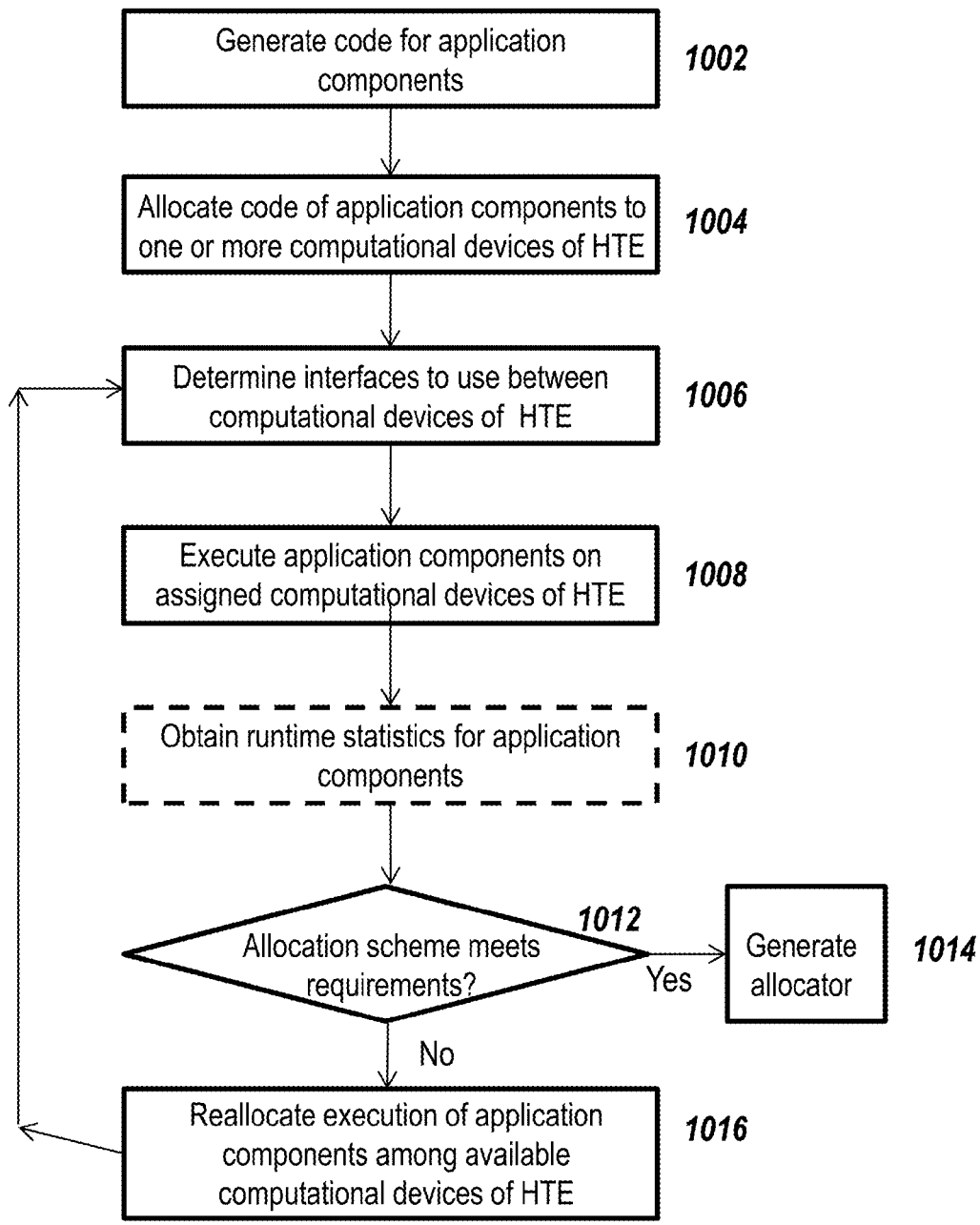
FIG. 10 is a flowchart illustrating exemplary processing for practicing an embodiment in a BDE or textual programming environment (TPE)

FIG. 10 is a flowchart illustrating exemplary processing for practicing an embodiment in a BDE or TPE so as to determine and generate a conventional static or dynamic allocator that meets design requirements using an ISA or an IDA, respectively.

Processing may start with generating code for application components (block 1002). The application components may be part of an application, such as a model in either a BDE or TPE. As provided above, an application component can be defined in a BDE by block, by subsystem, by rate, by model, by demarcated boundary, etc. Similarly, application components in a TPE may be defined by function, by object/method, by # pragma instrumentation, by model, by demarcated boundary, etc.

Processing may allocate execution of code for the application components to one or more computational devices of the HTE (block 1004). For example, in one embodiment, default settings may initially allocate all application components to one computational device. Allocating all application components to execute on a single computational device may predict the processing time (computational load) of each application component. However, such allocation may not predict the potential I/O wait times if dependent data were to come from a different computational device (i.e., wait times caused by inter-algorithm communications and synchronization). Also, the profiling results of the single computational device execution may not account for cache effects associated with multi-computational device parallel execution. That is, run-time or execution-time statistics such as computational load may not be an exact predictor for computational load when the application components are distributed across multiple computational devices executing in parallel. To remedy these potential consequences, the application components may be allocated to multiple computational devices rather than all of the components being assigned to execute on the same computational device.

The I/O interfaces may be determined to enable communication between the computational devices of the HTE (block 1006). In some embodiments, the user may determine the I/O interfaces. Once allocated, the application may be co-simulated by executing some application components in the co-simulation design environment and executing other application components for which code has been generated on the HTE using the assigned computational device(s) (block 1008). During co-simulation, the computational devices may communicate with each other using the assigned I/O interfaces.

Optionally, in some embodiments, profiling may be performed on various components running on the HTE computational devices during co-simulation. Run-time or execution-time statistics for the application components can be captured and stored or displayed (block 1010). The run-time or execution-time statistics may be displayed in the co-simulation design environment in various graphical and textual formats during co-simulation. For example, run-time or execution-time statistics may be displayed by back-annotating to the corresponding application components in the co-simulation design environment. For example, a textual display of run-time or execution-time statistics may include computational load, memory usage, power consumption, cache utilization, cache hit/miss statistics, system throughput, input wait times, buffer use/re-use, algorithm dependencies graph/timelines, etc. One of ordinary skill in the art will appreciate that performing profiling is an optional feature of the present application and may be omitted in various embodiments.

The processes sing may determine whether the modified allocation scheme meets requirements, for example, based on comparing the run-time or execution-time statistics to pre-determined criteria (block 1012). If the run-time or execution-time statistics indicate that the modified allocation scheme meets design requirements ("yes" for block 1012), a conventional static or dynamic allocator implementing the modified allocation scheme may be generated for the application (block 1014).

If the allocation scheme does not meet requirements ("no" for block 1012), the allocation scheme may be interactively modified by reallocating one or more application components to available computational devices during co-simulation (block 1016). Re-allocation of the application components to available computational devices results in a modified mapping, i.e., modified allocation scheme. The interactive changing of allocation scheme occurs without a user or program first having to re-generate, re-write, re-compile, re-link, re-download and/or re-run the application code. Embodiments allow implementing application components deployed as algorithms of execution in a multi-algorithm process to allow for changing the allocation scheme.

With the modified allocation scheme, the I/O interfaces may be re-determined. The code for the application components may be executed on the HTE computational devices according to the modified allocation scheme. Run-time or execution-time statistics may also be updated for the new, modified allocation scheme. In some embodiments, the run-time or execution-time statistics may be sent back to the co-simulation design environment and back-annotated to the corresponding application components. If the updated run-time or execution-time statistics indicate that the modified allocation scheme meets design requirements, a conventional static or dynamic allocator implementing the modified allocation scheme is generated for the application. If the allocation scheme does not meet requirements, the allocation scheme may be interactively modified once again. According to various embodiments, the processing may end without generating a conventional static or dynamic allocator.

The processing described above in reference to FIG. 10 illustrates an exemplary sequence in which an allocator that satisfies a design requirement may be produced. Processing depicted in FIG. 10 may stop once a conventional static or dynamic allocator satisfying the design requirements is found. In another exemplary embodiment, the processing of FIG. 10 may be adjusted so as to attempt to generate an optimal conventional static or dynamic allocator. The processing can include determining whether the current conventional static or dynamic allocator is the best so far in the co-simulation. The determination may be made based on pre-determined criteria. For example, design requirements for the application may be automatically compared to the profiling results of the modified allocation scheme to see if the profiling result passes a pre-determined threshold. One or more modified allocation schemes may be compared, and a best scheme may be determined, e.g., as the best-so-far allocation scheme. The resulting allocator may be the best-so-far conventional static or dynamic allocator implementing the best-so-far allocation scheme.

The potential re-factoring of the application design by assembling new application component combinations provides greater flexibility in identifying an optimal conventional static or dynamic allocator that meets application design requirements than does the changing of mappings alone. Thus, using the exemplary techniques described above, a generated conventional static or dynamic allocator that meets design requirements can continually be refined and improved to identify an optimal conventional static or dynamic allocator for an application under development in the co-simulation design environment.

If the co-simulation techniques described above are unable to identify a satisfactory conventional static or dynamic allocator, a user may need to change some of the variables affecting the co-simulation of the application design. For example, a different HTE platform (with different characteristics) may be chosen, complexity of the application design may be reduced, allocation requirements may be altered, or other changes may be made. The above-described techniques may be performed again to attempt to identify a satisfactory conventional static or dynamic allocator.

Figure 11:
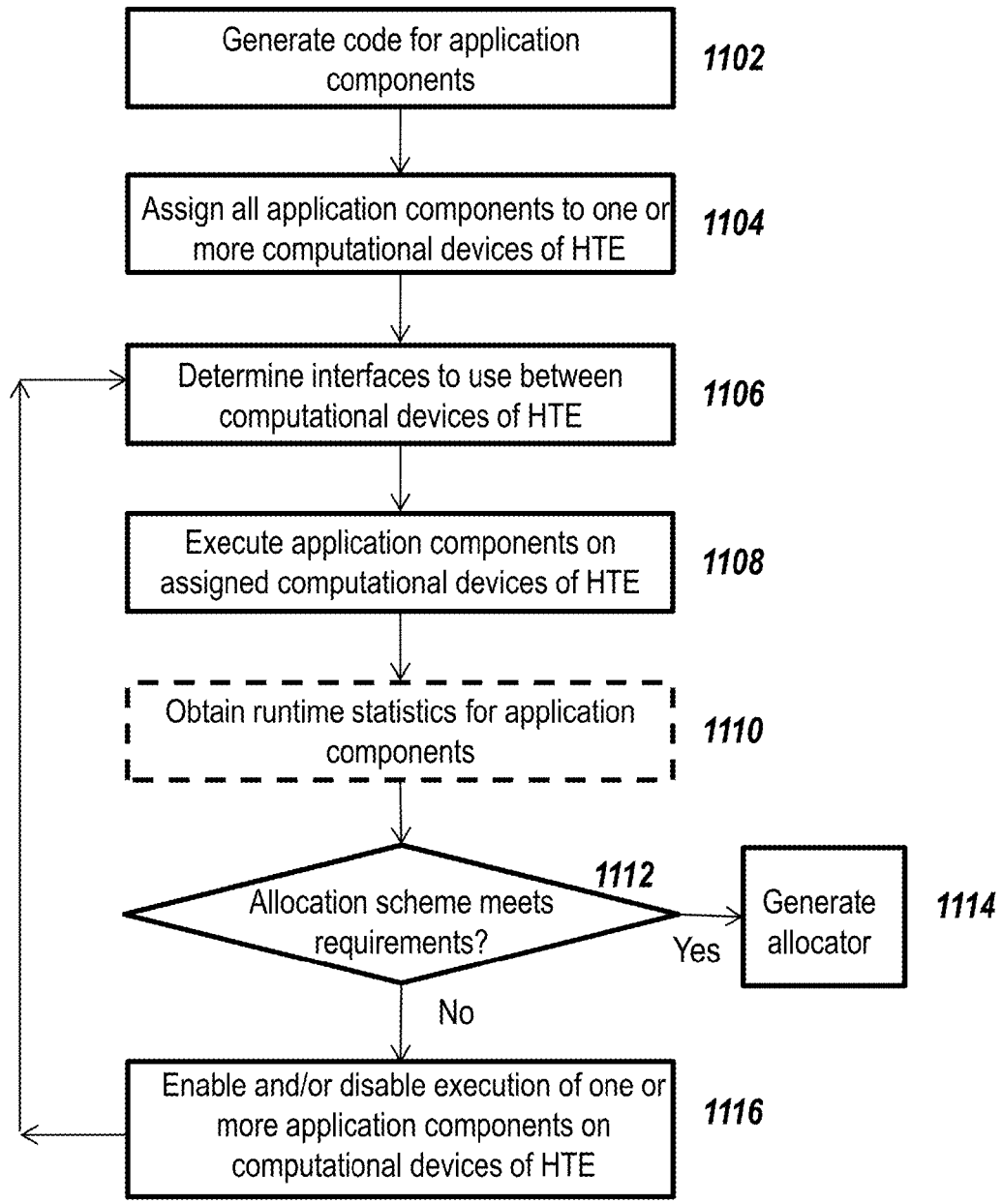
FIG. 11 is a flowchart illustrating exemplary processing for enabling/disabling execution of application components on computational devices.

FIG. 11 is a flowchart illustrating exemplary processing for enabling/disabling execution of application components on computational devices so as to determine and generate a conventional static or dynamic allocator that meets design requirements using an ISA or an IDA, respectively.

In FIG. 11 processing may begin by generating code for the application components (block 1102). Processing may allocate execution of code for all application components to one or more computational devices of the HTE (block 1104). The I/O interfaces may be determined for use during communication between the computational devices of the HTE (block 1106). Once allocated, the application may be co-simulated by executing some application components in the co-simulation design environment and executing other application components for which code has been generated on the HTE using the assigned computational device(s) (block 1108). During co-simulation, the computational devices may communicate with each other using the assigned I/O interfaces.

In some embodiments, profiling may be performed on different components running on the HTE computational devices during co-simulation. Run-time or execution-time statistics for the application components can be captured and stored or displayed (block 1110). The run-time or execution-time statistics may be displayed in the co-simulation design environment in various graphical and textual formats during co-simulation. For example, run-time or execution-time statistics may be displayed by back-annotation to the corresponding application components in the co-simulation design environment. For example, a textual display of run-time or execution-time statistics may include computational load, memory usage, power consumption, cache utilization, cache hit/miss statistics, system throughput, input wait times, buffer use/re-use, algorithm dependencies graph/timelines, etc.

The processing may determine whether the modified allocation scheme meets pre-determined design requirements based on comparing the run-time or execution-time statistics to pre-determined criteria (block 1112). If the run-time or execution-time statistics indicate that the modified allocation scheme meets design requirements ("yes" for block 1112), a conventional static or dynamic allocator implementing the modified allocation scheme is generated for the application (block 1114). The process ends with generating the conventional static or dynamic allocator.

If the allocation scheme does not meet requirements ("no" for block 1112), processing allows for interactively changing the allocation scheme by enabling and/or disabling execution of one or more application components on one or more of the computational devices during co-simulation (block 1116). For example, execution of some application components may be disabled on a given computing device while execution of some other application components may be enabled on the given computing device. Enabling/disabling of the application components on given computational devices results in a modified mapping, i.e., modified allocation scheme. The interactive changing of allocation scheme occurs without a user or program first having to re-generate, re-write, re-compile, re-link, re-download and/or re-run the application code.

With the modified allocation scheme, the I/O interfaces may be re-determined. The code for the application components may be executed on the HTE computational devices according to the modified allocation scheme. Run-time or execution-time statistics may also be updated for the new, modified allocation scheme. In some embodiments, the run-time or execution-time statistics may be sent back to the co-simulation design environment and back-annotated to the corresponding application components. If the updated run-time or execution-time statistics indicate that the modified allocation scheme meets design requirements, a conventional static or dynamic allocator implementing the modified allocation scheme is generated for the application. If the allocation scheme does not meet requirements, the allocation scheme may be interactively modified once again. According to various embodiments, the processing may end without generating a conventional static or dynamic allocator.

The processing described above in reference to FIG. 11 illustrates an exemplary sequence in which an allocator that is good enough to meet a design requirement is produced. Processing depicted in FIG. 11 may stop once any conventional static or dynamic allocator that meets design requirements is found.

In other exemplary embodiments, the processing of FIG. 11 can be adjusted so as to attempt to generate an optimal conventional static or dynamic allocator. The processing can include determining whether the current conventional static or dynamic allocator is the best so far in the co-simulation. The determination may be by a user or programmatically determined without user input based on pre-determined criteria. For example, design requirements for the application may be automatically compared to the profiling results of the modified allocation scheme to see if the profiling result passes a pre-determined threshold. One or more modified allocation schemes may be compared and the best scheme may be determined for example as the best-so-far allocation scheme. The resulting allocator may be the best-so-far conventional static or dynamic allocator implementing the best-so-far allocation scheme.

FIG. 12 depicts an exemplary distributed system suitable for practicing an exemplary embodiment. In, FIG. 12 an exemplary network environment may include one or more computing devices 1200 and 1220 communicating via a network 1210. Network 1210 may allow computing devices 1200 and 1220 to exchange data. The physical connection between computing devices 1200 and 1220 may be established using cable media or wireless media. Network 1210 may include hardware and software for providing communication capabilities between device 1200 and device 1220. Network 1210 may be the Internet, intranet, LAN (Local Area Network), WAN (Wide Area Network), MAN (Metropolitan Area Network), wireless network (e.g., using IEEE 802.13 and Bluetooth), etc. In addition network 1210 may use middleware, such as CORBA (Common Object Request Broker Architecture) or DCOM (Distributed Component Object Model) to allow a computer on the network to communicate directly with another computer or device that is connected to the network. The communication facilities can support the distributed implementations of the present invention and may utilize Remote Method Invocation (RMI), Remote Procedure Calls (RCP), Simple Object Access Protocol (SOAP), etc.

In the network environment, computing devices 1200 and 1220 may provide software components or products under a particular condition, such as a license agreement. The software components or products may include those for providing co-simulation design environment 502 and/or implementations of code for select elements. In one example, computing device 1200 may perform program development in the co-simulation design environment 502 while computing device 1220 hosts a target hardware used in the co-simulation.

Although the embodiments described above take place within a co-simulation design environment, other embodiments are also possible within the scope of the present invention. For example, in another embodiment, the search to identify static and dynamic allocators as described above may take place completely within a simulation environment. In such an embodiment, instead of generating code that will be executed on HTE during co-simulation, the performance of the HTE computational devices may be completely simulated within a simulation design environment. During the simulation, attributes of the allocation scheme may be adjusted based on performance data for the virtual computational devices. One type of application that can be co-simulated may include a block diagram model representing a real-world system. It should be noted that the term block diagram may also refer to and can include other graphical modeling formalisms. For instance, flow-charts are block diagrams of entities that are connected by relations. Flowcharts may be used to capture process flow and may not generally be suitable for describing dynamic system behavior. Data flow block diagrams are diagrams of entities with relations between them that describe a graphical programming paradigm where the availability of data is used to initiate execution of blocks in the diagram. In data flow diagrams, a block may represent an operation and a line may represent execution dependency describing the direction of data flowing between blocks. It will be appreciated that a block diagram model provided in one modeling formalism may include entities from other modeling formalisms.

Embodiments described herein may be provided as one or more computer-readable programs embodied on or in one or more physical and non-transitory computer-readable storage media. The media may be a floppy disk, a hard disk, a compact disc, a digital versatile disc, a flash memory card, a PROM, an MRAM, a RAM, a ROM, a magnetic tape, etc. In general, the computer-readable programs may be implemented in any programming language. Some examples of languages that can be used include MATLAB® programming language, FORTRAN, C, C++, C#, Python, FLASH, JavaScript, or JAVA®. A programming language may be an array-based language. An array-based language is a language where an array is a basic unit of data storage. An array may have zero or more dimensions. An example of an array based language may be a language at least a subset of which is executable in the MATLAB® programming environment. The software programs may be stored on, or in, one or more mediums as object code. Hardware acceleration may be used and all or a portion of the code may run on a FPGA, an Application Specific Integrated Processor (ASIP), or an Application Specific Integrated Circuit (ASIC). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described herein, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations described herein depending on specific deployments and/or applications. Further, disclosed implementations may not be limited to any specific combination of hardware.

Further, certain portions of the invention may be implemented as logic that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

We claim:

1. One or more non-transitory computer-readable storage media storing:
   one or more instructions that, when executed, cause at least one processor to:
      interact with a co-simulation design environment, the interacting for communicating with a target environment, the target environment including a plurality of heterogeneous computational devices;
      partition, during co-simulation of an application, the application into a plurality of components;
      allocate, using the co-simulation design environment, execution of a selected component of the application from among the plurality of components to a selected heterogeneous computational device of the target environment;
      wherein the plurality of components execute on the plurality of heterogeneous computational devices;
      receive an interactive instruction via the co-simulation design environment, the interactive instruction to alter allocation of the execution of the selected component of the application; and
      alter, based on the interactive instruction, the allocation of the execution of the selected component from the selected heterogeneous computational device to another one of the plurality of heterogeneous computational devices during co-simulation of the application.

2. The medium of claim 1, further storing:
   one or more instructions that, when executed, cause the at least one processor to:
   determine one or more input/output (I/O) interfaces for the plurality of heterogeneous computational devices, the plurality of heterogeneous computational devices communicate with each other via the I/O interfaces.

3. The medium of claim 2, further storing:
   one or more instructions that, when executed, cause the at least one processor to:
   alter the one or more I/O interfaces associated with at least one of the plurality of heterogeneous computational devices.

4. The medium of claim 1, wherein the allocating and altering are performed without performing one or more of: re-generating, re-compiling, re-synthesizing or re-running code for the application.

5. The medium of claim 1, wherein the plurality of heterogeneous computational devices include two or more of a processor, a simulator of a processor, a hardware description language (HDL) simulator, a field programmable gate array (FPGA), an application specific integrated circuit (ASIC), a graphical programming unit (GPU), a programmable logic controller (PLC), a SystemC simulator, a digital signal processor (DSP) and a transaction-level model (TLM) based virtual platform.

6. The medium of claim 1, wherein the altering is based on an input received from an input device or a program.

7. The medium of claim 1, further storing:
   one or more instructions that, when executed, cause the at least one processor to:
   receive execution data from the selected component executing on the selected heterogeneous computational device, the receiving occurring:
      in the co-simulation design environment, and
      while the application is executing.

8. The medium of claim 7, wherein the altering is based on the received execution data.

9. The medium of claim 7, further storing:
   one or more instructions that, when executed, cause the at least one processor to:
   display the received execution data in the co-simulation design environment during the executing of the selected component on the selected heterogeneous computational device of the target environment; and
   receive subsequent data in the co-simulation design environment during the executing, the subsequent data associated with the executing of the application following the altering the allocation of the execution of the selected component.

10. The medium of claim 7, wherein the received data associated with the executing of the selected component includes statistical data relating to the executing of the application on the target environment.

11. The medium of claim 10, wherein the statistical data includes data relating to at least one of:
   a buffer allocation, algorithm data synchronization information, a wait time between execution of the selected component, power consumption information, a gate count, a transaction count, a processing element count, and CPU utilization by the plurality of heterogeneous computational devices.

12. The medium of claim 1, further storing:
   one or more instructions that, when executed, cause the at least one processor to:
   generate a fixed mapping between the selected component and the selected heterogeneous computational device.

13. The medium of claim 12, further storing:
one or more instructions that, when executed, cause the at least one processor to:
determine, based on a pre-determined criteria, that the fixed mapping is an optimal fixed mapping.

14. The medium of claim 1, further storing:
one or more instructions that, when executed, cause the at least one processor to:
generate a conventional dynamic allocator.

15. The medium of claim 14, wherein the conventional dynamic allocator implements a rule set, the rule set:
including one or more rules, and
used in allocating the execution of the selected component to the selected heterogeneous computational device.

16. The medium of claim 1, wherein the allocating is based on a plurality of rule sets, the plurality of rule sets being organized in a hierarchy.

17. The medium of claim 16, storing:
one or more instructions that, when executed, cause the at least one processor to:
generate an optimal conventional dynamic allocator implementing the plurality of rule sets.

18. The medium of claim 16, wherein:
the plurality of rule sets includes an optimal rule set, and
an optimal conventional dynamic allocator implements the optimal rule set.

19. The medium of claim 1, wherein the allocating maintains data synchronization within the application.

20. The medium of claim 1, wherein the application includes a graphical model, the graphical model including a plurality of blocks, at least one of the plurality of blocks corresponding to the selected component.

21. The medium of claim 1, wherein the application includes a text-based model, the text-based model including a plurality of functions or scripts, at least one of the plurality of functions or scripts corresponding to the selected component.

22. One or more non-transitory computer-readable storage media storing:
one or more instructions that, when executed, cause at least one processor to:
interact with a co-simulation design environment, the interacting to communicate with an application executing on a target environment, the target environment including a plurality of heterogeneous computational devices;
partition the application into one or more components during co-simulation of the application;
allocate executing of the one or more components to the plurality of heterogeneous computational devices;
receive execution data from at least one of the one or more components in the co-simulation design environment while the application is running; and
disable the executing of at least one of the one or more components of the application on one of the plurality of heterogeneous computational devices when the application is executing on the plurality of heterogeneous computational devices based on the received execution data.

23. The medium of claim 22, further storing:
one or more instructions that, when executed, cause the at least one processor to:
re-enable the executing of the at least one of the one or more components on the one of the plurality of the heterogeneous computational devices.

24. The medium of claim 23, wherein the re-enabling occurs when the application is executing on the plurality of heterogeneous computational devices, the re-enabling occurring without performing one or more of: re-generating, re-compiling, re-synthesizing or re-running code for the application.

25. The medium of claim 22, further storing:
one or more instructions that, when executed, cause the at least one processor to:
receive execution data from the at least one of the one or more components executing on the one of the plurality of heterogeneous computational devices, the receiving occurring:
in the co-simulation design environment, and
when the application is executing.

26. The medium of claim 25, wherein the disabling is based on the received execution data.

27. The medium of claim 22, further storing:
one or more instructions that, when executed, cause the at least one processor to:
determine one or more input/output (I/O) interfaces for the plurality of heterogeneous computational devices, the plurality of heterogeneous computational devices communicate with each other via the I/O interfaces.

28. The medium of claim 27, further storing:
one or more instructions that, when executed, cause the at least one processor to:
alter the one or more I/O interfaces associated with at least one of the plurality of heterogeneous computational devices.

29. A computer-implemented method comprising:
interacting with a co-simulation design environment, the interacting to communicate with a target environment, the target environment including a plurality heterogeneous computational devices;
partitioning, during co-simulation of the application, the application into a plurality of components;
allocating execution of at least one of the plurality of components to one or more of the plurality of heterogeneous computational devices;
receiving execution data from at least one of the plurality of components in the co-simulation design environment while the application is running;
receiving an interactive instruction via the co-simulation design environment, the interactive instruction to alter allocation of the execution of the at least one the plurality of components based on the execution data;
altering, based on the received instruction, the allocation of the execution of the at least one the plurality of components from the one or more of the plurality of heterogeneous computational devices to a different one of the plurality of heterogeneous computational devices during co-simulation of the application.

30. A computer-implemented method comprising:
interacting with a co-simulation design environment, the interacting to communicate with an application executing on a target environment, the target environment including heterogeneous computational devices;
partitioning the application into one or more components during co-simulation of the application;
allocating, based on the partitioning, execution of the one or more components to one or more of the heterogeneous computational devices during the execution of the application; and
receiving execution data from at least one of the one or more components in the co-simulation design environment while the application is running; and disabling the execution of at least one of the one or more components on at least one of the heterogeneous computational devices during execution of the application based on the received execution data.

31. A system for interactively changing allocation of an application executing in a target environment, comprising:
a processor interacting with the memory to:
interact with a co-simulation design environment, the co-simulation design environment performing co-simulation of an application executing on a target environment,
communicate with the application while the application executes on the target environment, the communicating based on the interacting, the target environment including heterogeneous computational devices;
partition the application into a plurality of components;
allocate execution of at least one of the plurality of components to one or more of the heterogeneous computational devices, where the allocating occurs when without performing one or more of: re-generating, re-compiling, re-synthesizing or re-running code for the application;
receive an interactive instruction via the co-simulation design environment, altering allocation of the execution of the at least one of the plurality of components of the application while the application is executing, the altering based on the received interactive instruction;
receive execution data from the application executing on the one or more heterogeneous computational devices, the receiving occurring:
in the co-simulation design environment, and
when the application is executing; and
alter allocation of the execution of the at least one of the plurality of components of the application based on the received data, the altering performed while the application is executing on the heterogeneous computational devices, the allocating and altering occurring without performing one or more of: re-generating, re-compiling, re-synthesizing or re-running code for the application.

* * * * *

UNITED STATES PATENT AND TRADEMARK OFFICE
CERTIFICATE OF CORRECTION

PATENT NO. : 9,442,696 B1  
APPLICATION NO. : 14/157239  
DATED : September 13, 2016  
INVENTOR(S) : David Koh et al.

Page 1 of 1

It is certified that error appears in the above-identified patent and that said Letters Patent is hereby corrected as shown below:

On the Title Page

At item (73) Assignee, replace "The Math Works, Inc." with --The MathWorks, Inc.--

Signed and Sealed this
Twenty-seventh Day of December, 2016

Michelle K. Lee
*Director of the United States Patent and Trademark Office*